US012663742B2

(12) United States Patent
Ota

(10) Patent No.: US 12,663,742 B2
(45) **Date of Patent: *Jun. 23, 2026**

(54) FIXING DEVICE AND IMAGE FORMING APPARATUS

(71) Applicant: Toshiba Tec Kabushiki Kaisha, Tokyo (JP)

(72) Inventor: Hiroshi Ota, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 4 days.

This patent is subject to a terminal disclaimer.

(21) Appl. No.: 18/894,427

(22) Filed: Sep. 24, 2024

(65) Prior Publication Data

US 2025/0013176 A1 Jan. 9, 2025

Related U.S. Application Data

(63) Continuation of application No. 18/174,465, filed on Feb. 24, 2023, now Pat. No. 12,130,570.

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS 10,180,645 B1 1/2019 Kurosawa
12,130,570 B2 * 10/2024 Ota .................... G03G 15/2039
(Continued)

FOREIGN PATENT DOCUMENTS

JP 2004-317929 A 11/2004
JP 2006-243288 A 9/2006
(Continued)

OTHER PUBLICATIONS

Non-Final Office Action for U.S. Appl. No. 18/174,465, dated Mar. 27, 2024.
(Continued)

*Primary Examiner* — Stephanie E Bloss
*Assistant Examiner* — Michael A Harrison
(74) *Attorney, Agent, or Firm* — FOLEY & LARDNER LLP

(57) ABSTRACT

An image forming apparatus includes an image forming mechanism configured to form a developer image and transfer the formed developer image onto a medium and a fixing unit. The fixing unit includes a fixing member that contacts the medium the developer image is transferred onto, a heat source arranged to supply heat to the fixing member, a first temperature sensor that detects a temperature of a first region, and a second temperature sensor that detects a temperature of a second region of the fixing member. The image forming apparatus includes a controller that outputs information indicating an abnormality of the temperature detected by the first or the second temperature sensor, based on a difference between a first and a second estimation value. The first estimation value is an estimate of a temperature of the first region. The second estimation value is an estimate of a temperature of the second region.

20 Claims, 15 Drawing Sheets

(56) References Cited

U.S. PATENT DOCUMENTS

| | | | |
|---|---|---|---|
| 2013/0279933 | A1 | 10/2013 | Tanaka |
| 2021/0081733 | A1 | 3/2021 | Hitaka |
| 2021/0132529 | A1 | 5/2021 | Kataoka |
| 2022/0035290 | A1 | 2/2022 | Matsumura et al. |

FOREIGN PATENT DOCUMENTS

| | | | |
|---|---|---|---|
| JP | 2008-102413 | A | 5/2008 |
| JP | 2008-310086 | A | 12/2008 |
| JP | 2012-047775 | A | 3/2012 |
| JP | 2012-198271 | A | 10/2012 |
| JP | 2014-164149 | A | 9/2014 |
| JP | 2015-158634 | A | 9/2015 |
| JP | 2018-017885 | A | 2/2018 |
| JP | 2021-189339 | A | 12/2021 |

OTHER PUBLICATIONS

Notice of Allowance for U.S. Appl. No. 18/174,465, dated Jun. 27, 2024.

* cited by examiner

*FIG. 11*

| CENTER-SIDE WAE ESTIMATION VALUE t (°C) | ACTUAL TEMPERATURE RISE |
|---|---|
| 60 ≤ t | CENTER +30°C |
| 37 ≤ t < 60 | CENTER +20°C |
| 15 ≤ t > 37 | CENTER +10°C |
| 15 > t > -43 | NORMAL RANGE |
| -43 ≥ t > -73 | SIDE +10°C |
| -73 ≥ t | SIDE +20°C |

FIXING DEVICE AND IMAGE FORMING APPARATUS

CROSS-REFERENCE TO RELATED PATENT APPLICATIONS

This application is a continuation of U.S. patent application Ser. No. 18/174,465, filed Feb. 24, 2023, incorporated herein by reference in its entirety.

FIELD

Embodiments described herein relate generally to a fixing device and an image forming apparatus.

BACKGROUND

An image forming apparatus placed in a workplace or the like includes a fixing unit that applies heat and pressure to a printing medium to thereby fix a toner image on the printing medium. The fixing unit includes a temperature sensor that detects the temperature of the surface of a rotating body for fixing (a fixing member). The fixing unit controls, based on a detection signal of the temperature sensor, the surface temperature of the rotating body for fixing to reach a target value.

The temperature sensor, however, sometimes cannot detect accurate temperature because of, for example, adhesion of stain. If the temperature sensor cannot detect accurate temperature, a controller controls the surface temperature of the rotating body for fixing to temperature different from the target value.

BRIEF DESCRIPTION OF THE DRAWINGS

FIG. 11 is a diagram illustrating a table in which determination results of rises in actual temperatures with respect to a difference between WAE estimation values illustrated in FIG. 10 are collected;

DETAILED DESCRIPTION

According to an embodiment, a fixing device includes a fixing unit, a temperature sensor, and a controller. The fixing unit includes a fixing member with which a medium on which a developer image is transferred comes into contact and a heat source that supplies heat to the fixing member. The temperature sensor measures temperature of a surface with which the medium comes into contact in the fixing member. The controller outputs information indicating an abnormality of temperature detection by the temperature sensor if an estimation value of temperature of the fixing member is larger than a predetermined reference value.

An image forming apparatus according to the embodiment is explained below with reference to the drawings.

Figure 1:
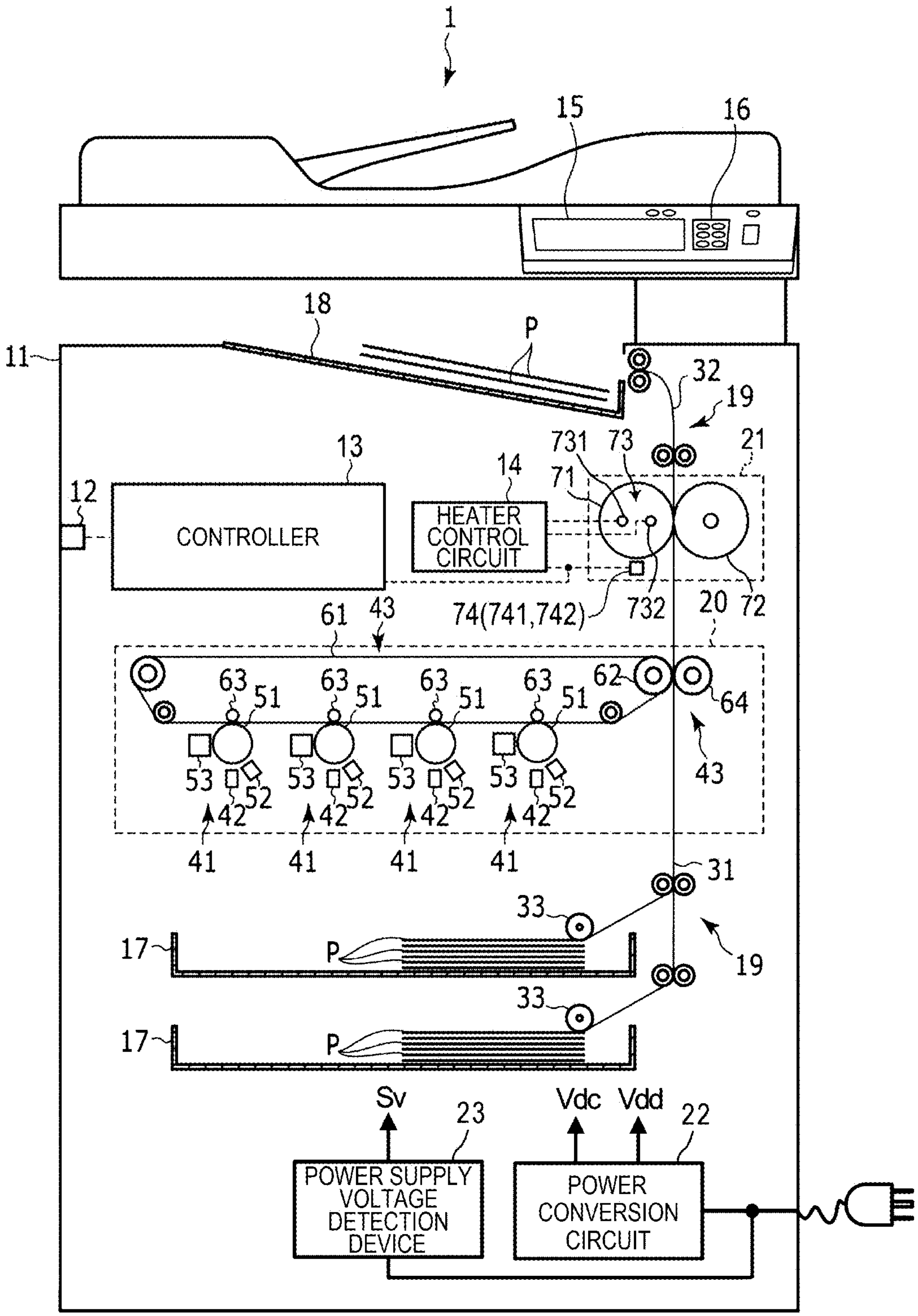
FIG. 1 is a diagram illustrating a configuration example of an image forming apparatus including a fixing device according to at least one embodiment.

FIG. 1 is a diagram for explaining a configuration example of an image forming apparatus 1 including the fixing device according to the embodiment.

The image forming apparatus 1 is, for example, a digital multifunction peripheral (MFP) that performs various kinds of processing such as image formation while conveying a recording medium such as a printing medium. The image forming apparatus 1 transfers a toner image formed by an electrophotographic scheme onto the printing medium serving as the recording medium and fixes the toner image on the printing medium in a fixing unit.

The image forming apparatus 1 receives toner from a toner cartridge and prints an image on the printing medium with the received toner. The toner may be single-color toner or may be color toner of colors such as cyan, magenta, yellow, and black. The toner may be decolorable toner that is decolored if heat is applied thereto.

As illustrated in FIG. 1, the image forming apparatus 1 includes a housing 11, a communication interface 12, a controller (a system controller) 13, a heater control circuit 14, a display device 15, an operation device 16, a plurality of paper trays 17, a paper discharge tray 18, a conveying mechanism 19, an image forming mechanism 20, a fixing unit 21, a power conversion circuit 22, and a power supply voltage detection device 23.

The housing 11 is a main body of the image forming apparatus 1. The housing 11 houses the communication interface 12, the controller 13, the heater control circuit 14, the display device 15, the operation device 16, the plurality of paper trays 17, the paper discharge tray 18, the conveying mechanism 19, the image forming mechanism 20, the fixing unit 21, the power conversion circuit 22, and the power supply voltage detection device 23.

The communication interface 12 is an interface for communicating with other equipment through a network. The communication interface 12 is used for communication with external equipment. The external equipment is a user terminal that instructs a printing job, a server functioning as an external management device, or the like. The communication interface 12 is configured by, for example, a LAN connector. The communication interface 12 may be an interface for performing wireless communication with other equipment according to a standard such as Bluetooth (registered trademark) or Wi-fi (registered trademark).

The controller (the system controller) 13 executes control of the sections of the image forming apparatus 1, data processing, and the like. For example, the controller 13 is a computer including a processor, a memory, and various interfaces. The processor executes programs stored by the memory, whereby the controller 13 performs the control of the sections and the data processing. The controller 13 is connected to the sections in the housing 11 by various internal interfaces.

The controller 13 generates a printing job based on image data and the like received from external equipment via the communication interface 12. The image data included in the printing job is data indicating an image to be formed on a printing medium P. The image data may be data for forming an image on one printing medium P or may be data for forming images on a plurality of printing media P. The printing job may include information indicating printing conditions such as information indicating color printing or monochrome printing.

The controller 13 includes an engine controller that controls operations of the conveying mechanism 19, the image forming mechanism 20, and the fixing unit 21. For example, the controller 13 controls conveyance of the printing medium P by the conveying mechanism 19. The controller 13 controls formation of a developer image by the image forming mechanism 20 and transfer of the developer image onto the printing medium P. The controller 13 controls fixing of the developer image on the printing medium P by the fixing unit 21. The controller 13 controls operations of the conveying mechanism 19, the image forming mechanism 20, and the fixing unit 21 to thereby form the image of the image data included in the printing job on the printing medium P.

The image forming apparatus 1 may include an engine controller separately from the controller 13. For example, in the image forming apparatus 1, an engine controller that controls at least one of the conveying mechanism 19, the image forming mechanism 20, the fixing unit 21, and the like may be provided separately from the controller 13. The engine controller provided separately from the controller 13 only has to acquire information necessary for the control from the controller 13.

The heater control circuit 14 is a temperature control device that controls, based on the control of the controller 13, energization to a heater 73 (a center heater 731 and a side heater 732) included in the fixing unit 21 explained below. The heater control circuit 14 generates energization power PC1 and energization power PC2 for energizing the heater 73 of the fixing unit 21. The heater control circuit 14 supplies the energization power PC1 to the center heater 731 and supplies the energization power PC2 to the side heater 732. The heater control circuit 14 is explained in detail below.

The display device 15 includes a display that displays an image according to an image signal input from the controller 13 or a display control section such as a graphic controller. For example, the display device 15 displays, on the display, a setting screen for various settings for the image forming apparatus 1.

The operation device 16 supplies an operation signal corresponding to operation in the operation device 16 to the controller 13. The operation device 16 is, for example, a touch sensor, a ten key, a power key, various function keys, or a keyboard. The touch sensor acquires information indicating a position designated in a certain region. The touch sensor may be configured as a touch panel integrally with the display device 15. The display device 15 and the operation device 16 may be provided in an operation panel functioning as a user interface.

The power conversion circuit 22 supplies a DC voltage to the sections in the image forming apparatus 1 using an AC voltage supplied from an AC power supply AC such as an external power supply. For example, the power conversion circuit 22 generates DC voltages Vdd and Vdc from the AC voltage supplied from the AC power supply AC. The power conversion circuit 22 supplies the DC voltage Vdd to the controller 13 and supplies the DC voltage Vdc to the heater control circuit 14. The power conversion circuit 22 supplies a DC voltage necessary for image formation generated from the AC voltage of the AC power supply AC to the image forming mechanism 20. The power conversion circuit 22 supplies a DC voltage necessary for conveyance of the printing medium P generated from the AC voltage of the AC power supply AC to the conveying mechanism 19.

The power supply voltage detection device 23 detects a voltage value of the AC voltage of the AC power supply AC supplied from the external power supply and outputs a power supply voltage detection result Sv. A configuration of the power supply voltage detection device 23 is not particularly limited and may be any configuration if a power supply voltage value can be detected. The power supply voltage detection device 23 may detect a voltage value of the DC voltage Vdc converted by the power conversion circuit 22 rather than the voltage value of the AC voltage of the AC power supply AC supplied from the power supply source. The power supply voltage detection result Sv output by the power supply voltage detection device 23 is input to the controller 13.

The controller 13 saves the power supply voltage value indicated by the power supply voltage detection result Sv. The controller 13 may transmit the power supply voltage value indicated by the power supply voltage detection result Sv to a host computer with the communication interface 12 via a network. In this case, the controller 13 may store transmission destination information such as a network address of the host computer in a nonvolatile memory or the like. The controller 13 may transmit, with the communication interface 12, the power supply voltage value indicated by the power supply voltage detection result Sv to another image forming apparatus connected via the network. The controller 13 may transmit the power supply voltage value indicated by the power supply voltage detection result Sv to another image forming apparatus connected to the image forming apparatus 1 via an interface.

Subsequently, a configuration of a conveyance system in the image forming apparatus 1 is explained.

The plurality of paper trays 17 are respectively cassettes that store the printing media P. The paper trays 17 are configured to be capable of receiving supply of the printing media P from the outside of the housing 11. For example, the paper trays 17 are configured to be capable of being drawn out from the housing 11.

The paper discharge tray 18 is a tray that supports the printing media P discharged from the image forming apparatus 1.

The conveying mechanism 19 is a mechanism that conveys the printing media P in the image forming apparatus 1. As illustrated in FIG. 1, the conveying mechanism 19 includes a plurality of conveyance paths. For example, the conveying mechanism 19 includes a paper supply conveyance path 31 and a paper discharge conveyance path 32.

Each of the paper supply conveyance path 31 and the paper discharge conveyance path 32 is configured by a plurality of motors, a plurality of rollers, and a plurality of guides. The plurality of motors rotate shafts based on control of the controller 13 to thereby rotate the rollers interlinked to the rotation of the shafts. The plurality of rollers rotate to thereby move the printing medium P. The plurality of guides control a conveyance direction of the printing medium P.

The paper supply conveyance path 31 takes in the printing medium P from the paper trays 17 and supplies the taken-in printing medium P to the image forming mechanism 20. The paper supply conveyance path 31 includes pickup rollers 33 corresponding to the paper trays 17. The pickup rollers 33 respectively take the printing media P in the paper trays 17 into the paper supply conveyance path 31.

The paper discharge conveyance path 32 is a conveyance path for discharging the printing medium P, on which an image is formed, to the outside of the housing 11. The printing medium P discharged by the paper discharge conveyance path 32 is supported by the paper discharge tray 18.

Subsequently, a configuration of the image forming mechanism 20 in the image forming apparatus 1 is explained.

The image forming mechanism 20 forms an image on the printing medium P. The image forming mechanism 20 forms an image on the printing medium P based on a printing job generated by the controller 13.

The image forming mechanism 20 includes a plurality of process units (image forming stations) 41, a plurality of exposing devices 42, and a transfer mechanism 43. The image forming mechanism 20 includes the exposing devices 42 for each of the process units 41. The plurality of process units 41 and the plurality of exposing devices 42 may respectively have the same configurations. Therefore, one process unit 41 and one exposing device 42 are explained.

First, the process unit 41 is explained.

The process unit 41 forms a toner image. For example, the plurality of process units 41 are provided for respective types of toners. For example, the plurality of process units 41 respectively correspond to color toners of cyan, magenta, yellow, black, and the like. Specifically, toner cartridges storing toners of different colors are connected to the process units 41.

The toner cartridge includes a toner storage container and a toner delivery mechanism. The toner storage container is a container that stores toner. The toner delivery mechanism is a mechanism configured by, for example, a screw that delivers the toner stored in the toner storage container.

The process unit 41 includes a photoconductive drum 51, an electrifying charger 52, a developing device 53, and the like.

The photoconductive drum 51 is a photoconductive body including a cylindrical drum and a photoconductive layer formed on the outer circumferential surface of the drum. The photoconductive drum 51 is rotated at constant speed by a driving mechanism.

The electrifying charger 52 uniformly charges the surface of the photoconductive drum 51. For example, the electrifying charger 52 applies a voltage (a developing bias voltage) to the photoconductive drum 51 using a charging roller to thereby charge the photoconductive drum 51 to uniform negative potential (contrast potential). The charging roller rotates according to the rotation of the photoconductive drum 51 in a state in which predetermined pressure is applied to the photoconductive drum 51.

The developing device 53 is a device that causes toner to adhere to the photoconductive drum 51. The developing device 53 includes a developer container, an agitating mechanism, a developing roller, a doctor blade, an auto toner control (ATC) sensor, and the like.

The developer container is a container that receives and stores the toner delivered from the toner cartridge. A carrier is stored in advance in the developer container. The toner delivered from the toner cartridge is agitated with the carrier by the agitating mechanism to thereby form a developer in which the toner and the carrier are mixed. The carrier is stored in the developer container at a manufacturing time of the developing device 53.

The developing roller rotates in the developer container to thereby cause the developer to adhere to the surface of the developing roller. The doctor blade is a member disposed at a predetermined interval from the surface of the developing roller. The doctor blade removes a part of the developer adhering to the surface of the rotating developing roller. Consequently, a layer of the developer having thickness corresponding to the interval between the doctor blade and the surface of the developing roller is formed on the surface of the developing roller.

The ATC sensor is, for example, a magnetic flux sensor that includes a coil and detects a voltage value generated in the coil. The voltage detected by the ATC sensor changes according to the density of a magnetic flux of the toner stored in the developer container. That is, the controller 13 determines, based on the voltage detected by the ATC sensor, a concentration ratio (a toner concentration ratio) of the toner remaining in the developer container to the carrier. The controller 13 causes, based on the toner concentration ratio, a motor, which drives the delivery mechanism of the toner cartridge, to operate to deliver the toner from the toner cartridge to the developer container of the developing device 53.

Subsequently, a configuration of the exposing device 42 is explained.

The exposing device 42 includes a plurality of light emitting elements. The exposing device 42 irradiates the charged photoconductive drum 51 with light from the light emitting elements to thereby form a latent image on the photoconductive drum 51. The light emitting elements are, for example, light emitting diodes (LEDs). One light emitting element is configured to irradiate one point on the photoconductive drum 51 with light. The plurality of light emitting elements are arrayed in a main scanning direction that is a direction parallel to a rotation axis of the photoconductive drum 51.

The exposing device 42 irradiates the photoconductive drum 51 with light with the plurality of light emitting elements arrayed in the main scanning direction to thereby form a latent image for one line on the photoconductive drum 51. Further, the exposing device 42 continuously irradiates the rotating photoconductive drum 51 with light to form latent images in a plurality of lines.

In the configuration explained above, if the surface of the photoconductive drum 51 charged by the electrifying charger 52 is irradiated with light from the exposing device 42, an electrostatic latent image is formed on the surface. If the layer of the developer formed on the surface of the developing roller approaches the surface of the photoconductive drum 51, the toner included in the developer adheres to the latent image formed on the surface of the photoconductive drum 51. Consequently, a toner image is formed on the surface of the photoconductive drum 51.

Subsequently, a configuration of the transfer mechanism 43 is explained.

The transfer mechanism 43 is configured to transfer the toner image formed on the surface of the photoconductive drum 51 onto the printing medium P. The transfer mechanism 43 transfers the toner image formed on the surface of the photoconductive drum 51 onto a primary transfer belt 61 and transfers the toner image transferred on the primary transfer belt 61 onto the printing medium P.

The transfer mechanism 43 includes, for example, a primary transfer belt 61, a secondary transfer counter roller 62, a plurality of primary transfer rollers 63, and a secondary transfer roller 64.

In the configuration example illustrated in FIG. 1, the primary transfer belt 61 is an endless belt wound on the secondary transfer counter roller 62 and a plurality of winding rollers. The surface on the inner side (the inner circumferential surface) of the primary transfer belt 61 comes into contact with the secondary transfer counter roller 62 and the plurality of winding rollers. The surface on the outer side (the outer circumferential surface) of the primary transfer belt 61 is opposed to the photoconductive drums 51 of the process units 41.

The secondary transfer counter roller 62 is rotated by a motor. The secondary transfer counter roller 62 rotates to thereby convey the primary transfer belt 61 in a predetermined conveyance direction. The plurality of winding rollers are configured to be capable of freely rotating. The plurality of winding rollers rotate according to the movement of the primary transfer belt 61 by the secondary transfer counter roller 62.

The plurality of primary transfer rollers 63 are configured to bring the primary transfer belt 61 into contact with the photoconductive drums 51 of the process units 41. The plurality of primary transfer rollers 63 are provided to correspond to the photoconductive drums 51 of the plurality of process units 41. Specifically, the plurality of primary transfer rollers 63 are respectively provided in positions (primary transfer positions) opposed to, across the primary transfer belt 61, the photoconductive drums 51 of the process units 41 corresponding to the plurality of primary transfer rollers 63. The primary transfer rollers 63 come into contact with the inner circumferential surface side of the primary transfer belt 61 and displace the primary transfer belt 61 to the photoconductive drum 51 side. Consequently, the primary transfer rollers 63 bring the outer circumferential surface of the primary transfer belt 61 into contact with the photoconductive drums 51.

The secondary transfer roller 64 is provided in a position (a secondary transfer position) opposed to the primary transfer belt 61. The secondary transfer roller 64 comes into contact with and applies pressure to the outer circumferential surface of the primary transfer belt 61. Consequently, a transfer nip in which the secondary transfer roller 64 and the outer circumferential surface of the primary transfer belt 61 are in close contact is formed. If the printing medium P passes through the transfer nip, the secondary transfer roller 64 presses the printing medium P passing through the transfer nip against the outer circumferential surface of the primary transfer belt 61.

The secondary transfer roller 64 and the secondary transfer counter roller 62 rotate to thereby convey the printing medium P, which is supplied from the paper supply conveyance path 31, in a state in which the printing medium P is held between the secondary transfer roller 64 and the secondary transfer counter roller 62. Consequently, the printing medium P passes through the transfer nip.

In the configuration explained above, if the outer circumferential surface of the primary transfer belt 61 comes into contact with the photoconductive drum 51, the toner image formed on the surface of the photoconductive drum 51 is transferred onto the outer circumferential surface of the primary transfer belt 61. If the image forming mechanism 20 includes the plurality of process units 41, the primary transfer belt 61 receives toner images from the photoconductive drums 51 of the plurality of process units 41. The toner image transferred on the outer circumferential surface of the primary transfer belt 61 is conveyed to, by the primary transfer belt 61, the transfer nip in which the secondary transfer roller 64 and the outer circumferential surface of the primary transfer belt 61 are in close contact. If the printing medium P is present in the transfer nip, the toner image transferred on the outer circumferential surface of the primary transfer belt 61 is transferred onto the printing medium P in the transfer nip.

Subsequently, a configuration of the fixing unit 21 in the image forming apparatus 1 is explained.

The fixing unit 21 fixes the toner image on the printing medium P on which the toner image is transferred. The fixing unit 21 operates based on the control of the controller 13. It is assumed that the fixing device according to the embodiment is a device including the fixing unit 21, the heater control circuit 14, and the controller 13. The fixing unit 21 includes a rotating body for fixing functioning as a fixing member, a pressurizing member, a heating member (a heat source), and a temperature sensor. Various configurations are possible as the fixing unit applied to the fixing device according to the embodiment. FIG. 1 illustrates a first configuration example of the fixing unit 21.

In the first configuration example illustrated in FIG. 1, the fixing unit 21 includes a heat roller 71, a press roller 72, a heater 73, and a temperature sensor 74. The heat roller 71 is an example of the rotating body for fixing (the fixing member). The press roller 72 is an example of the pressurizing member. The heater 73 is an example of the heating member (the heat source). The fixing unit 21 in the first configuration example includes the heater 73 including a plurality of heat sources. In the first configuration example, the heater 73 includes a heater (a center heater) 731 that is an example of a first heat source and a heater (a side heater) 732 that is an example of a second heat source.

The temperature sensor 74 is an example of a temperature sensor that detects the temperature of the surface of the heat roller 71. In this embodiment, the fixing unit 21 includes a plurality of temperature sensors as the temperature sensor 74. The temperature sensors 74 include contact sections, which come into contact with the surface of the heat roller 71, and detect the temperatures of parts with which the contact sections come into contact. In the first configuration example, the temperature sensors 74 include a temperature sensor (a center temperature sensor) 741 and a temperature sensor (a side temperature sensor) 742. The contact section of the center temperature sensor 741 comes into contact with the center region in the surface of the heat roller 71. The contact section of the side temperature sensor 742 comes into contact with a side region in the surface of the heat roller 71.

Figure 2:
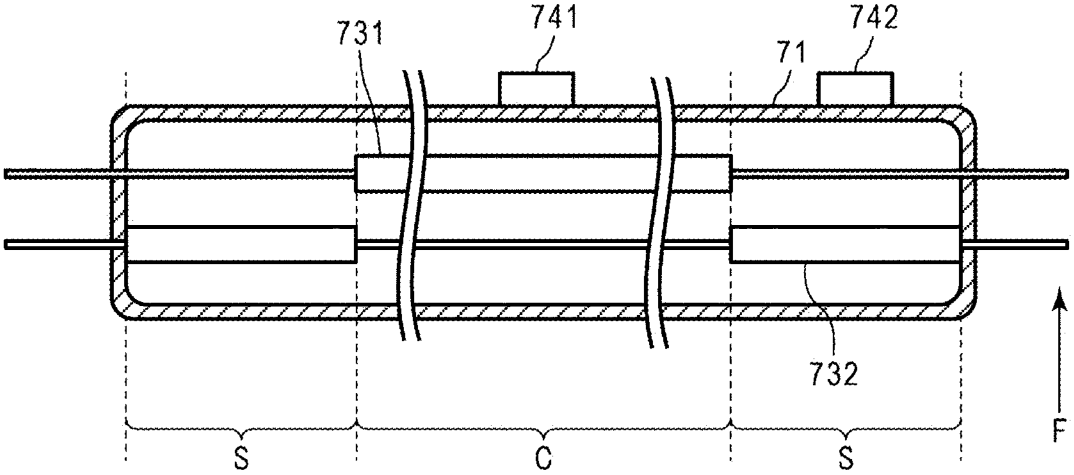
FIG. 2 is a diagram illustrating a first configuration example of a fixing unit in the fixing device.

FIG. 2 is a sectional view illustrating a configuration example of the periphery of the heat roller 71 in the fixing unit 21 in the first configuration example illustrated in FIG. 1.

The heat roller 71 is a rotating body for fixing that rotates in a state in which the rotating body for fixing is heated by the heater 73. The heat roller 71 includes a cored bar formed by metal in a hollow shape and an elastic layer formed on the outer circumference of the cored bar.

The diameter of the heat roller 71 is, for example, ϕ30 mm. The cored bar is made of, for example, aluminum having thickness of 0.6 mm. Peripheral speed of the heat roller 71 is, for example, 210 mm/s. The elastic layer is made of, for example, fluorocarbon resin (polytetrafluoroethylene). The diameter of the heat roller 71, the thickness of the cored bar, the value of the peripheral speed, and the material names of the cored bar and the elastic layer explained above are examples and are not limited thereto.

In the heat roller 71, the inner side of the cored bar is heated by the heater 73 functioning as the heating member (the heat source) disposed on the inner side of the cored bar formed in the hollow shape. Heat applied to the inner side of the cored bar is transferred to the surface of the heat roller 71 (the surface of the elastic layer) that is the outer side of the cored bar. The rotating body for fixing may be configured as an endless belt.

The press roller 72 is provided in a position opposed to the heat roller 71. The press roller 72 includes a cored bar formed by metal with a predetermined outer diameter and an elastic layer formed on the outer circumference of the cored bar. The diameter of the press roller 72 is, for example, ϕ30 mm. The press roller 72 is made of, for example, silicon rubber or fluorocarbon rubber.

The press roller 72 applies pressure to the heat roller 71 with stress applied from a tension member. The pressure is, for example, 150 N. The diameter of the press roller 72, the value of the pressure, and the material name are examples and are not limited thereto. The pressure is applied from the press roller 72 to the heat roller 71, whereby a nip (a fixing nip) in which the press roller 72 and the heat roller 71 are in close contact is formed. The press roller 72 is rotated by a motor. The press roller 72 rotates to thereby move the printing medium P entering the fixing nip and presses the printing medium P against the heat roller 71. The heat roller 71 and the press roller 72 may respectively include release layers on the surfaces thereof.

The heater 73 is configured by a plurality of heat generating bodies functioning as heat sources that emit heat with electric power supplied from the heater control circuit 14. The heater 73 in the fixing unit 21 in the first configuration example illustrated in FIGS. 1 and 2 includes the center heater 731 and the side heater 732 functioning as two heat sources (heat generating bodies). The center heater 731 and the side heater 732 are, for example, halogen lamp heaters including halogen lamps.

The heater 73 in the fixing unit 21 in the first configuration example is configured by two heaters, that is, the center heater 731 and the side heater 732. The center heater 731 heats the center (a center region C) in a rotation axis direction in the heat roller 71. The side heater 732 heats a peripheral section (a side region S) other than the center in the rotation axis direction in the heat roller 71. The printing medium P is conveyed in a conveyance direction F illustrated in FIG. 2. For example, the center region C and the side region S may be set according to a size of a medium used as the printing medium P.

The center heater 731 and the side heater 732 each generate heat with electric power supplied by the control of the controller 13. Power consumption of the center heater 731 and the side heater 732 is, for example, 600 W.

If executing fixing processing on the printing medium P narrow in the rotation axis direction of the heat roller 71 (the conveyance direction F of the printing medium P), the controller 13 heats the center region C of the heat roller 71. If heating the center region C of the heat roller 71, the controller 13 actuates the center heater 731 without actuating the side heater 732 with the heater control circuit 14.

If executing the fixing processing on the printing medium P wide in the rotation axis direction of the heat roller 71 (the conveyance direction F of the printing medium P), the controller 13 heats the entire heat roller 71 (both of the center region C and the side region S). If heating the entire heat roller 71, the controller 13 actuates both of the center heater 731 and the side heater 732 with the heater control circuit 14.

The temperature sensor 741 and the temperature sensor 742 include contact sections, which come into contact with the surface of the heat roller 71, and detect temperatures of parts with which the contact sections come into contact. The temperature sensor 741 and the temperature sensor 742 are, for example, thermistors. The temperature sensor 741 and the temperature sensor 742 are arrayed in parallel to the rotation axis of the heat roller 71. In the first configuration example illustrated in FIG. 2, the temperature sensor 741 detects the temperature of the center region (the center portion of three regions divided in the rotation axis direction) C in the rotation axis direction of the heat roller 71. The temperature sensor 742 detects the temperature of the side region (any side portion of the three regions divided in the rotation axis direction) S in the rotation axis direction of the heat roller 71.

The temperature sensors 741 and 742 respectively include contact sections (detecting sections) that come into contact with the surface of the heat roller 71. The detecting section comes into contact with the surface of the center region C of the heat roller 71, whereby the temperature sensor 741 detects the temperature of the center region C of the heat roller 71. The detecting section comes into contact with the surface of the side region S of the heat roller 71, whereby the temperature sensor 742 detects the temperature of the side region S of the heat roller 71.

The temperature sensors 741 and 742 supply temperature detection result signals indicating temperature detection results to the controller 13. If the center region C of the heat roller 71 is heated, the controller 13 actuates the center heater 731 based on the temperature detected by the temperature sensor 741. If the entire heat roller 71 is heated, the controller 13 actuates the center heater 731 and the side heater 732 based on the temperatures detected by the temperature sensors 741 and 742.

The heat roller 71 and the press roller 72 apply, to the printing medium P passing through the fixing nip, heat controlled to a predetermined temperature range and pressure. The toner on the printing medium P is fixed on the surface of the printing medium P by the heat applied from the heat roller 71 and the pressure applied from the heat roller 71 and the press roller 72. Consequently, the toner image is fixed on the printing medium P passed through the fixing nip. The printing medium P passed through the fixing nip is introduced into the paper discharge conveyance path 32 and discharged to the outside of the housing 11.

Subsequently, a configuration of a control system in the image forming apparatus 1 according to at least one embodiment is explained.

Figure 3:
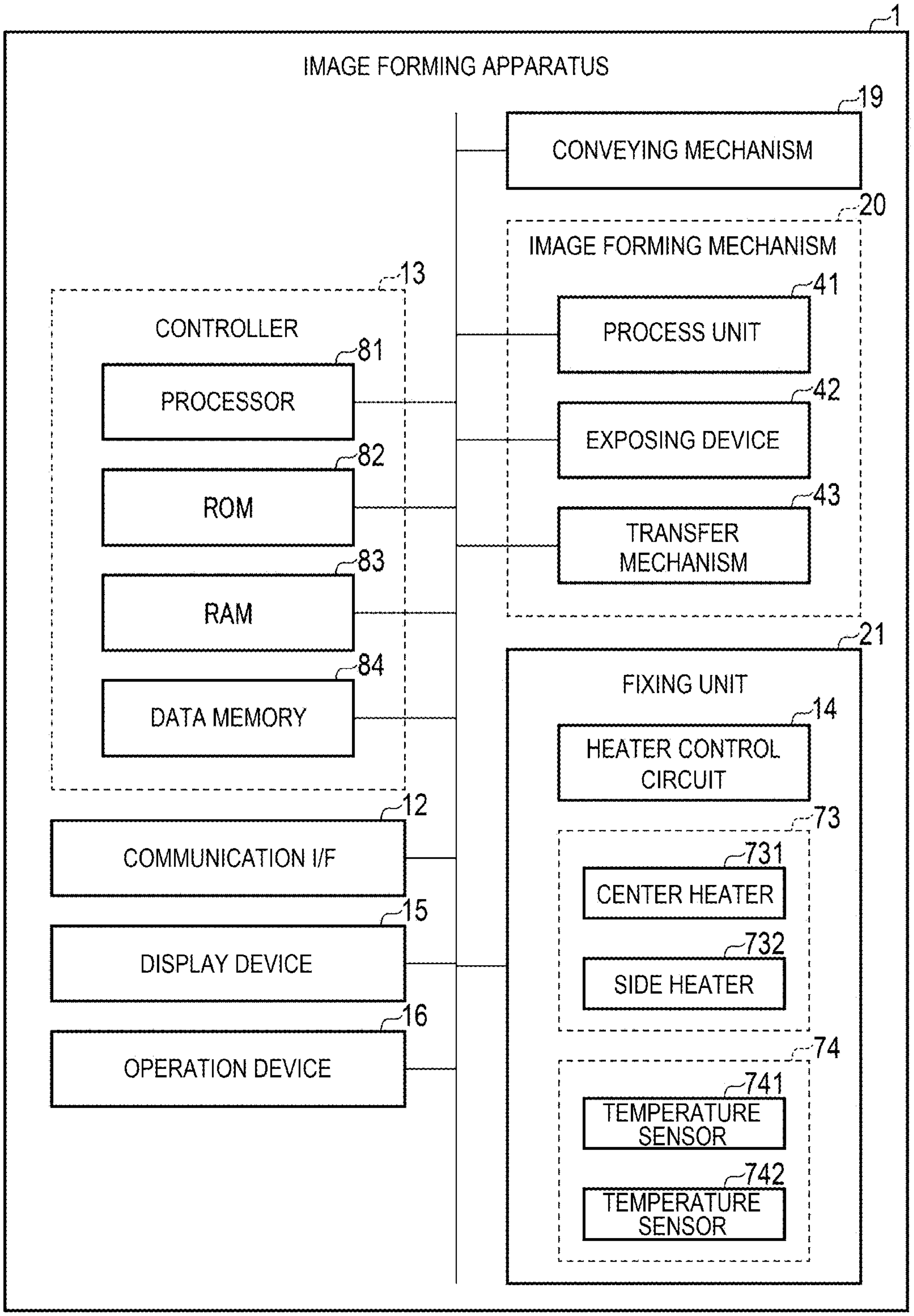
FIG. 3 is a block diagram illustrating a configuration example of a control system in the image forming apparatus including the fixing device.

FIG. 3 is a block diagram illustrating a configuration example of the control system in the image forming apparatus 1.

As illustrated in FIG. 3, in the image forming apparatus 1, the communication interface 12, the heater control circuit 14, the display device 15, the operation device 16, the conveying mechanism 19, the image forming mechanism 20, the fixing unit 21, and the like are connected to the controller (the system controller) 13.

The controller 13 includes a processor 81, a ROM (Read Only Memory) 82, a RAM (Random Access Memory) 83, and a data memory 84. As the controller 13, a computer is configured by the processor 81, the ROM 82, the RAM 83, and the data memory 84. The controller 13 may include an ASIC that is a processor for image processing.

The processor 81 is equivalent to a central part of the computer functioning as the controller 13. The processor 81 controls the sections of the image forming apparatus 1 according to an operating system or application programs. The processor 81 is, for example, a CPU (Central Processing Unit).

The ROM 82 and the RAM 83 are equivalent to a main storage part of the computer functioning as the controller 13. The ROM 82 is a nonvolatile memory region. The RAM 83 is a volatile memory region. The ROM 82 stores the operating system or the application programs. The ROM 82 stores control data necessary for the processor 81 in executing processing for controlling the sections. The RAM 83 is used as a work area in which data is rewritten as appropriate by the processor 81. The RAM 83 includes, for example, a work area for storing image data.

The data memory 84 is configured by a rewritable nonvolatile memory. The data memory 84 is equivalent to an auxiliary storage part of the computer functioning as the controller 13. The data memory 84 is configured by a storage device such as an EEPROM (registered trademark) (Electric Erasable Programmable Read-Only Memory), a HDD (Hard Disk Drive), or an SSD (Solid State Drive). The data memory 84 stores data such as setting data used by the processor 81 in performing various kinds of processing. The data memory 84 saves data generated in the processing executed by the processor 81. The data memory 84 may store the application programs.

The controller 13 controls the image forming mechanism 20. For example, the controller 13 controls the process units 41, the exposing devices 42, and the transfer mechanism 43. For example, the controller 13 controls, for the charging devices 52 of the process units 41, ON and OFF for charging. The controller 13 controls, for the exposing devices 42 of the process units 41, ON and OFF of laser light with which the photoconductive drums 51 are irradiated. Consequently, electrostatic latent images are formed on the photoconductive drums 51.

The controller 13 controls, for the developing devices 53 of the process units 41, ON and OFF of development biases. Consequently, the electrostatic latent images on the photoconductive drums 51 are developed by the toners supplied from the developing devices 53 and toner images are formed on the photoconductive drums 51. The controller 13 controls, for the transfer mechanism 43, primary transfer biases in the primary transfer positions. The toner images on the photoconductive drums 51 are transferred onto the primary transfer belt 61 in the primary transfer positions. Further, the controller 13 controls, for the transfer mechanism 43, secondary transfer biases in the secondary transfer position. Consequently, the toner images on the primary transfer belt 61 are transferred onto the printing medium P.

The controller 13 controls the fixing device including the fixing unit 21. The controller 13 controls operations of the center heater 731 and the side heater 732 with the heater control circuit 14 according to detection results of the temperature sensor 741 and the temperature sensor 742. The heater control circuit 14 controls energization to the center heater 731 and the side heater 732 by operating according to a control instruction from the controller 13. A part or all of components of the heater control circuit 14 may be included in the controller 13.

The heater control circuit 14 controls energization to the center heater 731 and the side heater 732 such that the temperature of the surface of the heat roller 71 reaches a set target temperature. For example, the controller 13 sets a target temperature (a control target) in the heater control circuit 14. The heater control circuit 14 supplies electric power to the center heater 731 while referring to temperature detected by the temperature sensor 741 such that the temperature of the center region C of the heat roller 71 reaches a target value. The heater control circuit 14 supplies electric power to the side heater 732 while referring to temperature detected by the temperature sensor 742 such that the temperature of the side region S of the heat roller 71 reaches a target value.

The heater control circuit 14 interrupts the power supply to the center heater 731 if the temperature of the center region C of the heat roller 71 reaches a set center high stop temperature. The heater control circuit 14 interrupts the power supply to the side heater 732 if the temperature of the side region S of the heat roller 71 reaches a set side high stop temperature. The center high stop temperature and the side high stop temperature in the heater control circuit 14 are set and corrected by the controller 13.

Subsequently, control for the heater 73 of the fixing unit 21 in the image forming apparatus 1 according to the embodiment is explained.

The image forming apparatus 1 including the fixing device according to this embodiment controls the heater 73 of the fixing unit 21 with WAE (Weighted Average control with Estimate temperature) control. The WAE control is performed assuming that transfer of heat in the fixing unit 21 is equivalently represented by a CR time constant of an electric circuit. In the WAE control, a circuit in which a heat capacity in the fixing unit 21 is represented as C, resistance of heat transfer is represented as R, and a heat source is a DC voltage source (referred to as heat CR circuit) is assumed.

That is, the heat capacity of the fixing unit 21 in the heat CR circuit is replaced with a capacitor C. The resistance of the heat transfer is replaced with a resistor R. The heat source is replaced with a DC voltage source. The heat CR circuit is a circuit that operates according to an input voltage pulse. The heat CR circuit operates according to an input voltage pulse for which energization and interruption of the energization from the DC voltage source are repeated based on an energization pulse. Such heat CR circuit applies heat generated as an output voltage to the heating member.

In the heat CR circuit, values (C and R) of elements are set based on an energization amount to the heating member, a heat capacity of the rotating body for fixing, and the like. A heat quantity propagating to the surface of the rotating body for fixing, which is a control target, can be estimated based on the heat CR circuit explained above. In the WAE control, the energization amount to the heating member is controlled based on an actual surface temperature of the rotating body for fixing estimated from, for example, input energy to the fixing unit by performing simulation in the heat CR circuit. With such WAE control, the fixing device in the image forming apparatus 1 according to the embodiment controls the surface temperature of the rotating body for fixing to reach the target value.

The image forming apparatus 1 can specify an actual input voltage (input energy) with the power supply voltage detection device 23. Consequently, the image forming apparatus 1 is capable of performing operation control using the actual input voltage in the WAE control FIG. 4 is a diagram illustrating a configuration example of the heater control circuit 14 in the image forming apparatus 1 that performs the WAE control according to the embodiment.

Figure 4:
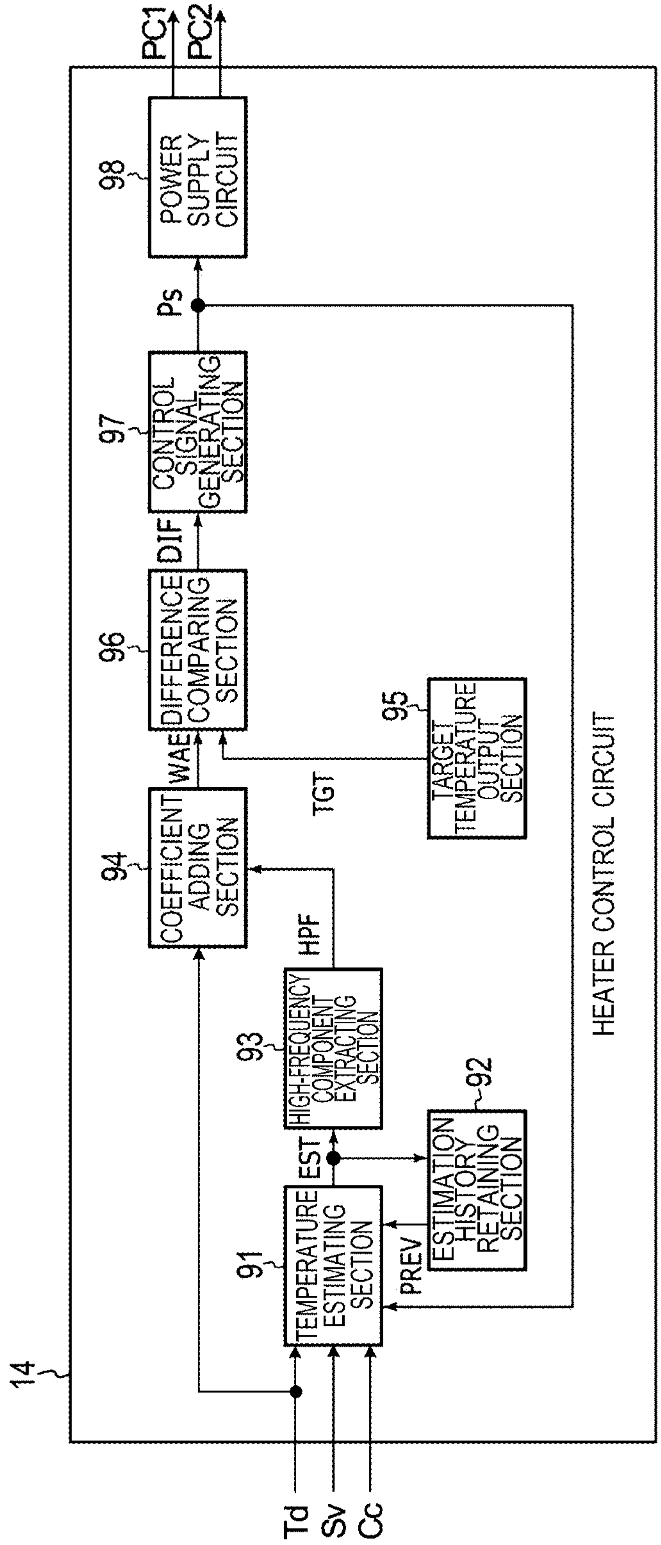
FIG. 4 is a diagram illustrating a configuration example of a heater control circuit in the fixing device.

In the configuration example illustrated in FIG. 4, the heater control circuit 14 controls energization to the heater 73 of the fixing unit 21. The heater control circuit 14 generates the energization power PC1 and the energization power PC2 for energizing the heater 73 of the fixing unit 21. The heater control circuit 14 supplies electric power to the center heater 731 with the energization power PC1 and supplies electric power to the side heater 732 with the energization power PC2.

The heater control circuit 14 includes a temperature estimating section 91, an estimation history retaining section 92, a high-frequency component extracting section 93, a coefficient adding section 94, a target temperature output section 95, a difference comparing section 96, a control signal generating section 97, and a power supply circuit 98. A temperature detection result Td from the temperature sensor 74 and a power supply voltage detection result Sv saved in, for example, the data memory 84 of the controller 13 are input to the heater control circuit 14.

The temperature estimating section 91 performs temperature estimation processing for estimating temperature (a WAE estimation value) of the surface of the heat roller 71. In the configuration example illustrated in FIG. 4, the temperature detection result Td from the temperature sensor 74, the power supply voltage detection result Sv, an estimation history PREV, and an energization pulse Ps are input to the temperature estimating section 91. The temperature estimating section 91 estimates a WAE estimation value based on the temperature detection result Td, the power supply voltage detection result Sv, the estimation history PREV, and the energization pulse Ps. The temperature estimating section 91 outputs the estimated WAE estimation value that is a temperature estimation result EST.

The temperature estimating section 91 estimates, based on the energization amount to the heater 73, the heat capacity of the heat roller 71, and the like, a heat quantity given to the heat roller 71 by the heat CR circuit in which the values of the elements are set in advance. The temperature estimating section 91 generates the temperature estimation result EST based on the estimated heat quantity given to the heat roller 71, the temperature detection result Td, the power supply voltage detection result Sv, the estimation history PREV, and the energization pulse Ps. The temperature estimating section 91 outputs the temperature estimation result EST to the estimation history retaining section 92 and the high-frequency component extracting section 93.

In at least one embodiment, the temperature estimating section 91 estimates (calculates) a center WAE estimation value ct and a side WAE estimation value st as the temperature estimation result EST. The center WAE estimation value ct is an estimation value of the temperature of the surface in the center region C of the heat roller 71. The side WAE estimation value st is an estimation value of the temperature of the surface in the side region of the heat roller 71. The temperature estimating section 91 supplies the center WAE estimation value ct and the side WAE estimation value st to the controller 13.

The estimation history retaining section 92 retains a history of the temperature estimation result EST. The estimation history retaining section 92 outputs the estimation history PREV, which is a history of the temperature estimation result EST (the temperature estimation result EST in the past), to the temperature estimating section 91.

The high-frequency component extracting section 93 performs high-pass filter processing for extracting a high-frequency component of the temperature estimation result EST. The high-frequency component extracting section 93 outputs a high-frequency component HPF, which is a signal indicating the extracted high-frequency component, to the coefficient adding section 94.

The coefficient adding section 94 performs coefficient addition processing that is correction of the temperature detection result Td. The temperature detection result Td from the temperature sensor 74 and the high-frequency component HPF from the high-frequency component extracting section 93 are input to the coefficient adding section 94. The coefficient adding section 94 corrects the temperature detection result Td based on the high-frequency component HPF. Specifically, the coefficient adding section 94 multiplies together the high-frequency component HPF and a preset coefficient, adds a product of the high-frequency component HPF and the coefficient to the temperature detection result Td, and calculates a corrected temperature value WAE. The coefficient adding section 94 outputs the corrected temperature value WAE to the difference comparing section 96. The coefficient adding section 94 outputs the corrected temperature value WAE to the processor 81 of the controller 13 as well.

The target temperature output section 95 outputs a set target temperature TGT to the difference comparing section 96. The target temperature TGT is set in the target temperature output section 95 by the controller 13.

The difference comparing section 96 performs difference calculation processing. The difference comparing section 96 calculates a difference DIF between the target temperature TGT output from the target temperature output section 95 and the corrected temperature value WAE output from the coefficient adding section 94. The difference comparing section 96 outputs the calculated difference DIF to the control signal generating section 97.

The control signal generating section 97 generates the energization pulse Ps, which is a pulse signal for controlling energization to the heater 73, based on the difference DIF. The control signal generating section 97 outputs the energization pulse Ps to the power supply circuit 98 and the temperature estimating section 91.

The power supply circuit 98 supplies the energization power PC1 and the energization power PC2 to the heater 73 based on the energization pulse Ps. The power supply circuit 98 performs energization to the heater 73 of the fixing unit 21 using a DC power supply voltage Vdc supplied from the power conversion circuit 22. The power supply circuit 98 switches, for example, based on the energization pulse Ps, a state in which the DC power supply voltage Vdc supplied from the power conversion circuit 22 is supplied to the heater 73 and a state in which the DC power supply voltage Vdc is not supplied. Consequently, the power supply circuit 98 supplies the energization power PC1 and the energization power PC2 to the heater 73. In other words, the power supply circuit 98 changes an energization time to the heater 73 of the fixing unit 21 according to the energization pulse Ps.

A lighting control signal corresponding to a size of a fixing target printing medium P is input to the power supply circuit 98 from the processor 81 of the controller 13. The power supply circuit 98 supplies the energization power PC1 or both of the energization power PC1 and the energization power PC2 to the heater 73 according to the lighting control signal input from the processor 81, that is, the size of the printing medium P.

The power supply circuit 98 may be configured integrally with the fixing unit 21. The heater control circuit 14 may be configured to supply the energization pulse Ps to a power supply circuit of the heater 73 of the fixing unit 21 rather than supplying the energization power PC to the heater 73.

As explained above, the heater control circuit 14 adjusts, based on a heat capacity correction amount Cc, the temperature detection result Td, the power supply voltage detection value Sv, the temperature estimation history PREV, and the energization pulse Ps, a power amount to the heater 73 of the fixing unit 21 such that the surface temperature of the heat roller 71 reaches the target temperature. Consequently, the heater control circuit 14 can control the electric power supplied to the heater 73 such that the surface temperature of the heat roller 71 reaches the target temperature.

The temperature estimating section 91, the estimation history retaining section 92, the high-frequency component extracting section 93, the coefficient adding section 94, the target temperature output section 95, the difference comparing section 96, and the control signal generating section 97 of the heater control circuit 14 may be respectively configured by electric circuits or may be configured by software. A part or the entire heater control circuit 14 may be included in the controller 13. For example, the controller 13 may include a component that calculates (estimates) a center WAE estimation value and a side WAE estimation value serving as a WAE estimation value.

A design reference value may be used as the heat capacity C of the fixing unit 21 used in the WAE control. In the WAE control using the design reference value, since it is likely that variation occurs in a heat capacity of a fixing unit for each machine body, the heat capacity correction amount Cc for the heat capacity C may be set. For example, the image forming apparatus 1 may provide, in the data memory 84, a correction amount table indicating the heat capacity correction amount Cc serving as a correction amount for the heat capacity C. The correction amount table stores a heat capacity correction amount corresponding to a temperature difference set for each machine body of the image forming apparatus 1. The temperature difference is a difference between temperature of the heater of the fixing unit 21 estimated by the heater control circuit 14 with the heat capacity correction amount set to "0" and actually measured temperature of the heater.

If estimating temperature taking into account the heat capacity correction amount Cc, the heater control circuit 14 acquires, from the controller 13, the heat capacity correction amount Cc of the image forming apparatus 1 based on the correction table. If the heat capacity correction amount Cc is input to the heater control circuit 14, the temperature estimating section 91 estimates a WAE estimation value based on the temperature detection result Td, the power supply voltage detection result Sv, the heat capacity correction amount Cc, the estimation history PREV, and the energization pulse Ps. Consequently, the temperature estimating section 91 is capable of outputting the WAE estimation value that is the temperature estimation result EST estimated using the heat capacity correction amount Cc.

Subsequently, a relation among an estimation value (a WAE estimation value) of a surface temperature of the heat roller 71, a detected temperature of the temperature sensor 74, and an actual temperature of the heat roller 71 in the fixing unit 21 is explained.

It is assumed that a ready state indicates a control state in which the surface temperature of the heat roller 71 is maintained at a predetermined target temperature. For example, if the image forming apparatus 1 starts, the controller 13 executes a warmup operation for raising the temperature of the heat roller 71 to the predetermined target temperature. If the temperature of the heat roller 71 reaches the predetermined target temperature, the controller 13 shifts to the ready state and maintains the temperature of the heat roller 71 at the predetermined target temperature. A state in which the ready state is maintained and printing is not executed is referred to as left in ready.

Figure 5:
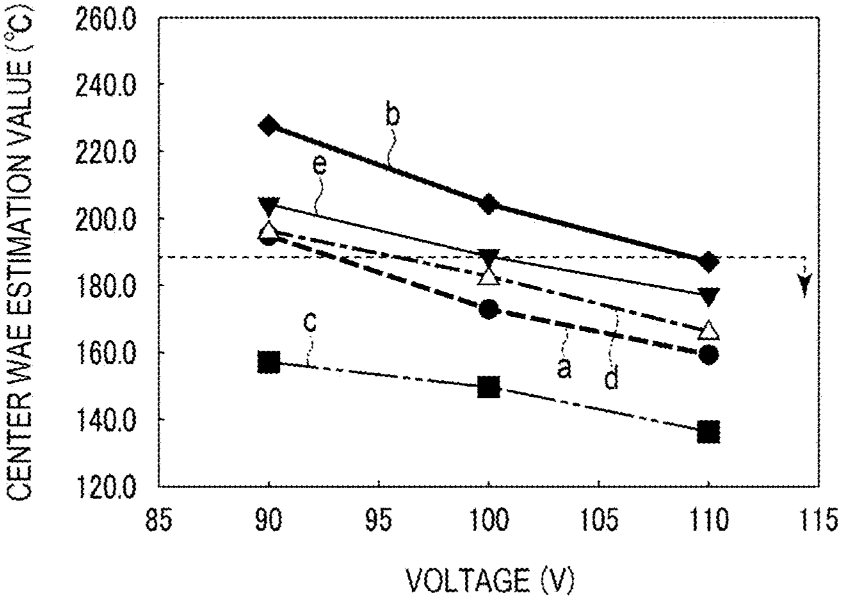
FIG. 5 is a diagram illustrating a relation between an input voltage to a center heater and a center WAE estimation value in a ready state of the fixing device.

FIG. 5 is a diagram illustrating a relation between an input voltage to the center heater 731 and the center WAE estimation value ct in the ready state.

A tape simulating stain (hereinafter referred to as pseudo stain tape) is stuck to the detecting section of the temperature sensor 74 to reproduce various stain conditions. The pseudo stain tape is, for example, a heat resistant tape made of a polyimide-based material. As the pseudo stain tape, a tape having first thickness (for example, 0.43 mm) and a tape having second thickness (for example, 0.21 mm) smaller than the first thickness are selectively used.

FIG. 5 illustrates a relation between input voltages to the center heater 731 and center WAE estimation values ct in four states (conditions) in which stain conditions reproduced by the pseudo stain tape are different. FIG. 5 illustrates, as a center WAE estimation value, an average value of center WAE estimation values in the last twenty seconds (40 seconds to 60 seconds) in the case in which the ready state continued for one minute. It is assumed that examples illustrated in FIGS. 6 to 10 explained below are also based on results measured with the last twenty seconds as a measurement time in the case in which the ready state continued for one minute. The last twenty seconds in the case in which the ready state continued for one minute is a measurement time that is set assuming that the measurement time is a time period in which control for maintaining the ready state is stabilized after the shift to the ready state.

In the example illustrated in FIG. 5, a control target of the center region C of the heat roller 71 is set to 160° C. and a control target of the side region S of the heat roller 71 is set to 155° C. FIGS. 6 to 10 refereed to below also illustrate numerical values and the like based on measurement results in the ready state in which the control target of the center region C is set to 160° C. and the control target of the side region S is set to 155° C.

A graph "a" illustrated in FIG. 5 indicates a relation between an input voltage to the center heater 731 and a center WAE estimation value in a state in which stain does not adhere to any of the detecting section of the temperature sensor 741 and the detecting section of the temperature sensor 742.

A graph "b" illustrated in FIG. 5 indicates a relation between an input voltage and a center WAE estimation value in a state in which a pseudo stain tape having first thickness is stuck to the detecting section of the temperature sensor 741. The first thickness is, for example, 0.42 mm.

A graph "c" illustrated in FIG. 5 indicates a relation between an input voltage and a center WAE estimation value in a state in which the pseudo stain tape having the first thickness is stuck to the detecting section of the temperature sensor 742.

A graph "d" illustrated in FIG. 5 indicates a relation between an input voltage and a center WAE estimation value in a state in which a pseudo stain tape having second thickness is stuck to both of the detecting section of the temperature sensor 741 and the detecting section of the temperature sensor 742. It is assumed that the second thickness is smaller than the first thickness. For example, the second thickness is 0.21 mm.

A graph "e" illustrated in FIG. 5 indicates a relation between an input voltage and a center WAE estimation value in a state in which the pseudo stain tape having the first thickness is stuck to both of the detecting section of the temperature sensor 741 and the detecting section of the temperature sensor 742.

According to the example illustrated in FIG. 5, as indicated by the graph "b", in a state in which stain adheres to only the detecting section of the temperature sensor 741, the center WAE estimation value is larger compared with the other states. As indicated by the graph "c" illustrated in FIG. 5, in a state in which stain adheres to only the detecting section of the temperature sensor 742, the side WAE estimation value is larger than the side WAE estimation values in the other states. However, as indicated by the graph "d" and the graph "e", in a state in which stain adheres to both of the detecting section of the temperature sensor 741 and the detecting section of the temperature sensor 742, the center WAE estimation value is larger than the center WAE estimation value in a state in which stain does not adhere indicated by the graph "a".

Figure 6:
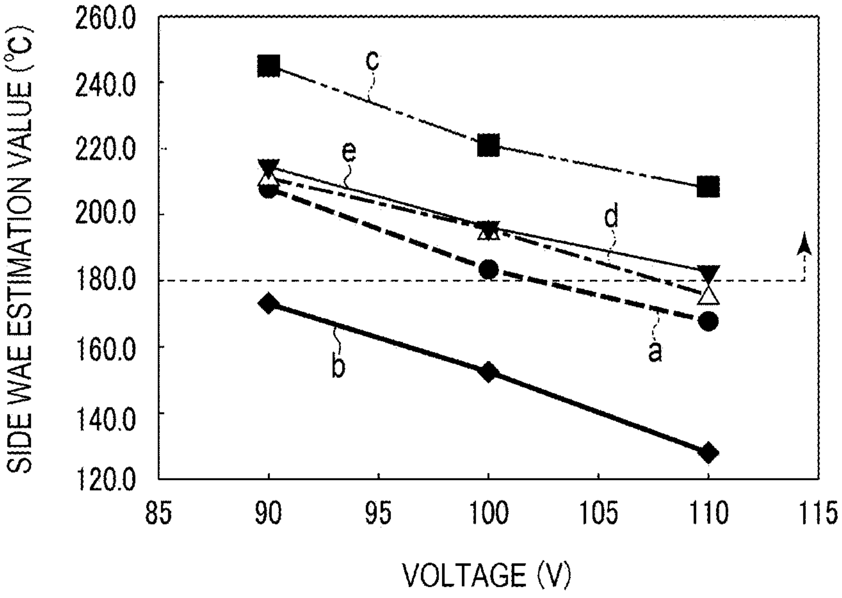
FIG. 6 is a diagram illustrating a relation between an input voltage to a side heater and a side WAE estimation value in the ready state of the fixing device.

FIG. 6 is a diagram illustrating a relation between an input voltage supplied to the side heater 732 and a side WAE estimation value in the ready state.

FIG. 6 illustrates a relation between input voltages to the side heater 732 and side WAE estimation values in four states in which stain conditions reproduced by the pseudo stain tape are different. FIG. 6 illustrates an example of side WAE estimation values in the last twenty seconds (40 seconds to 60 seconds) in the case in which the left in ready continued for one minute.

A graph "a" illustrated in FIG. 6 indicates a relation between an input voltage to the side heater 732 and a side WAE estimation value in a state in which stain does not adhere to any of the detecting section of the temperature sensor 741 and the detecting section of the temperature sensor 742.

A graph "b" illustrated in FIG. 6 indicates a relation between an input value and a side WAE estimation value in a state in which the pseudo stain tape having the first thickness is stuck to the detecting section of the temperature sensor 741.

A graph "c" illustrated in FIG. 6 indicates a relation between an input voltage and a side WAE estimation value in a state in which the pseudo stain tape having the first thickness is stuck to the detecting section of the temperature sensor 742.

A graph "d" illustrated in FIG. 6 indicates a relation between an input voltage and a side WAE estimation value in a state in which the pseudo stain tape having the second thickness is stuck to both of the detecting section of the temperature sensor 741 and the detecting section of the temperature sensor 742.

A graph "e" illustrated in FIG. 6 indicates a relation between an input voltage and a side WAE estimation value in a state in which the pseudo stain tape having the first thickness is stuck to both of the detecting section of the temperature sensor 741 and the detecting section of the temperature sensor 742.

According to the example illustrated in FIG. 6, as indicated by the graph "c", in a state in which stain adheres to only the detecting section of the temperature sensor 742, the side WAE estimation value is larger compared with the other states. As indicated by the graph "b", in a state in which stain adheres to only the detecting section of the temperature sensor 741, the side WAE estimation value is small. However, as indicated by the graph "d" and the graph "e" of FIG. 6, in a state in which stain adheres to both of the detecting section of the temperature sensor 741 and the detecting section of the temperature sensor 742, the side WAE estimation value is larger than the side WAE estimation value in the case in which stain does not adhere.

According to FIGS. 5 and 6, if only the detecting section of the temperature sensor 741 is stained, the center WAE estimation value ct is large and the side WAE estimation value st is small. That is, if only the detecting section of the temperature sensor 741 in contact with the center region is stained, a difference t between the WAE estimation values defined by ct−st=t is a large value. If a threshold for detecting stain of the center region (the detecting section of the temperature sensor 741) is set for the difference t between the WAE estimation values, it is possible to determine that the detecting section of the temperature sensor 741 is stained. According to the measurement results illustrated in FIGS. 5 and 6, it is also possible to set a threshold for estimating, from the difference t between the WAE estimation values, a rise in an actual temperature with respect to a detected temperature of the temperature sensor 741.

On the other hand, if only the detecting section of the temperature sensor 742 is stained, the center WAE estimation value ct decreases and the side WAE estimation value st increases. Therefore, the difference t between the WAE estimation values defined by ct−st=t is a small value (a large minus value) if only the detecting section of the temperature sensor 742 in the side region is stained. If a threshold for detecting stain of the side region (the detecting section of the temperature sensor 742) is set for the difference t between the WAE estimation values, it is possible to determine that the detecting section of the temperature sensor 742 is stained. According to the measurement results illustrated in FIGS. 5 and 6, it is also possible to set a threshold for estimating, from the difference t between the WAE estimation values, a rise in an actual temperature of the side region with respect to a detected temperature of the temperature sensor 742.

If both of the detecting section of the temperature sensor 741 and the detecting section of the temperature sensor 742 are stained, both of the center WAE estimation value and the side WAE estimation value are large. For example, an upper limit value (a first upper limit value) for the center WAE estimation value is set to 190° C. based on the measurement result illustrated in FIG. 5. An upper limit value (a second upper limit value) for the side WAE estimation value is set to 180° C. based on the measurement result illustrated in FIG. 6. If such upper limit values are set, it is possible to estimate that both of the detecting sections of the temperature sensors are stained if the center WAE estimation value is equal to or larger than the first upper limit value and the side WAE estimation value is equal to or larger than the second upper limit value.

Subsequently, a relation between input voltages and actual temperatures of the heat roller 71 corresponding to stain conditions of the detecting sections of the temperature sensors 741 and 742 in the ready state is explained.

Figure 7:
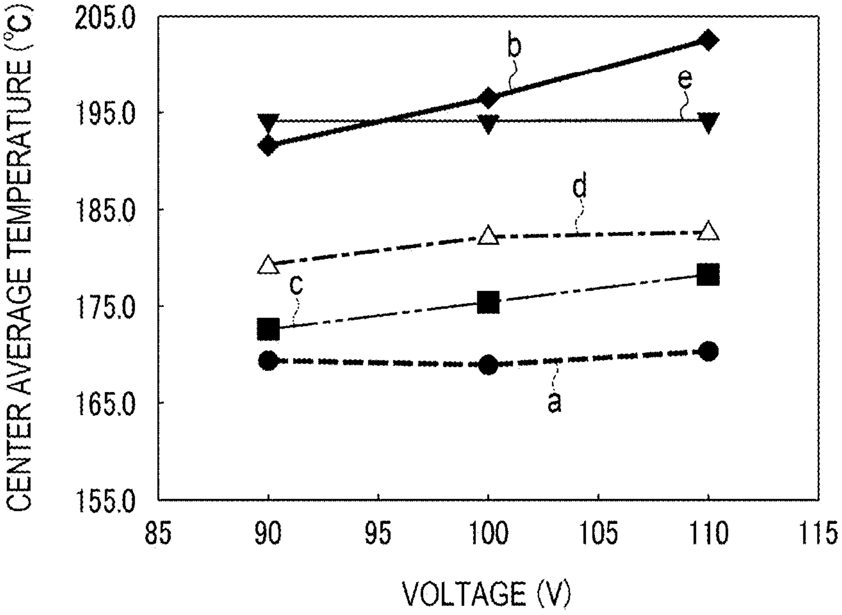
FIG. 7 is a diagram illustrating a relation between an input voltage and an actual temperature of a center region in a predetermined period during left in ready of the fixing device.

FIG. 7 is a diagram illustrating a relation between input voltages and actual temperatures of the center region C in the last twenty seconds in the case in which the left in ready continued for one minute.

FIG. 7 illustrates an example in which a relation between input voltages and actual temperatures of the center region C in four states in which stain conditions reproduced by the pseudo stain tape are different is measured. FIG. 7 illustrates a measurement example of actual temperatures of the center region C in the last twenty seconds in the case in which the left in ready continued for one minute. As an actual temperature, for example, an average value of temperatures measured by a thermocouple or the like is calculated.

A graph "a" illustrated in FIG. 7 indicates a relation between an input voltage and an actual temperature of the center region C in a state in which stain does not adhere to any of the detecting section of the temperature sensor 741 and the detecting section of the temperature sensor 742.

A graph "b" illustrated in FIG. 7 indicates a relation between an input voltage and an actual temperature of the center region C in a state in which the pseudo stain tape having the first thickness is stuck to the detecting section of the temperature sensor 741.

A graph "c" illustrated in FIG. 7 indicates a relation between an input voltage and an actual temperature of the center region C in a state in which the pseudo stain tape having the first thickness is stuck to the detecting section of the temperature sensor 742.

A graph "d" illustrated in FIG. 7 indicates a relation between an input voltage and an actual temperature of the center region C in a state in which the pseudo stain tape having the second thickness is stuck to both of the detecting section of the temperature sensor 741 and the detecting section of the temperature sensor 742.

A graph "e" illustrated in FIG. 7 indicates a relation between an input voltage and an actual temperature of the center region C in a state in which the pseudo stain tape having the first thickness is stuck to both of the detecting section of the temperature sensor 741 and the detecting section of the temperature sensor 742.

The example illustrated in FIG. 7 indicates that, if the graph "a" and the other graphs "b" to "e" are compared, the actual temperatures rise as stain adheres to the detecting section of the temperature sensor 741. If the graph "a" and the graph "b" are compared, a temperature difference is approximately 30° C. at an input voltage 100 V. In the ready state, control for maintaining the center region C at a control target temperature is performed according to a detected temperature of the temperature sensor 741. Accordingly, a temperature difference between the graph "a" and the graphs "b" to "e" corresponds to a temperature difference between the actual temperature of the center region C and the center control target temperature. Therefore, the temperature difference between the graph "a" and the graphs "b" to "e" illustrated in FIG. 7 is a value indicating a rise in the actual temperature in the center region C with respect to the detected temperature of the temperature sensor 741.

The example illustrated in FIG. 7 indicates a tendency that, as more stain adheres to the detecting section of the temperature sensor 741, the rise in the actual temperature in the center region C is larger. For example, if the graph "d" and the graph "e" illustrated in FIG. 7 are compared, the rise in the actual temperature in the center region C is larger if the pseud stain tape is thicker (the graph "e"). That is, the measurement example illustrated in FIG. 7 indicates that a temperature difference between the detected temperature of the temperature sensor 741 and the actual temperature in the center region C changes according to an amount of stain adhering to the detecting section of the temperature sensor 741.

Figure 8:
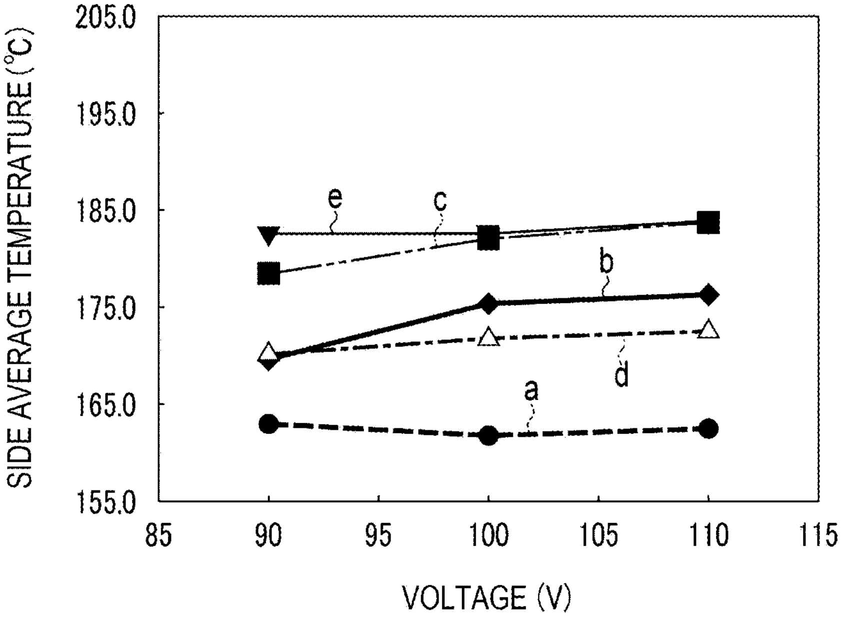
FIG. 8 is a diagram illustrating a relation between an input voltage and an actual temperature of a side region in the predetermined period during the left in ready of the fixing device.

FIG. 8 is a diagram illustrating a relation between an input voltage and an actual temperature of the side region S in the case in which the left in ready continued for one minute.

FIG. 8 illustrates an example in which a relation between input voltages and actual temperatures of the side region S in four states in which stain conditions reproduced by the pseudo stain tape are different is measured. FIG. 8 illustrates a measurement example of actual temperatures of the side region S in the case in which the left in ready continued for one minute. As an actual temperature, for example, an average value of temperatures measured by a thermocouple or the like is calculated.

A graph "a" illustrated in FIG. 8 indicates a relation between an input voltage and an actual temperature of the side region S in a state in which stain does not adhere to any of the detecting section of the temperature sensor 741 and the detecting section of the temperature sensor 742.

A graph "b" illustrated in FIG. 8 indicates a relation between an input voltage and an actual temperature of the side region S in a state in which the pseudo stain tape having the first thickness is stuck to the detecting section of the temperature sensor 741.

A graph "c" illustrated in FIG. 8 indicates a relation between an input voltage and an actual temperature of the side region S in a state in which the pseudo stain tape having the first thickness is stuck to the detecting section of the temperature sensor 742.

A graph "d" illustrated in FIG. 8 indicates a relation between an input voltage and an actual temperature of the side region S in a state in which the pseudo stain tape having the second thickness is stuck to both of the detecting section of the temperature sensor 741 and the detecting section of the temperature sensor 742.

A graph "e" illustrated in FIG. 8 indicates a relation between an input voltage and an actual temperature of the side region S in a state in which the pseudo stain tape having the first thickness is stuck to both of the detecting section of the temperature sensor 741 and the detecting section of the temperature sensor 742.

The example illustrated in FIG. 8 indicates that, if the graph "a" and the other graphs "b" to "e" are compared, the actual temperatures rise as stain adheres to the detecting section of the temperature sensor 742. A temperature difference between the graph "a" and the graph "c" is approximately 20° C. at an input voltage 100 V. In the ready state, control for maintaining the side region S at a control target temperature is performed according to a detected temperature of the temperature sensor 742. Accordingly, a temperature difference between the graph "a" and the graphs "b" to "e" corresponds to a temperature difference between the actual temperature of the side region S and the side control target temperature. Therefore, the temperature difference between the graph "a" and the graphs "b" to "e" illustrated in FIG. 8 is a value indicating a rise in the actual temperature in the side region S with respect to the detected temperature of the temperature sensor 742.

The example illustrated in FIG. 8 indicates a tendency that, as more stain adheres to the detecting section of the temperature sensor 742, the rise in the actual temperature in the side region S is larger. For example, if the graph "d" and the graph "e" illustrated in FIG. 8 are compared, the rise in the actual temperature in the side region S is larger if the pseud stain tape is thicker (the graph "e"). That is, the measurement example illustrated in FIG. 8 indicates that a temperature difference between the detected temperature of the temperature sensor 742 and the actual temperature in the side region S changes according to an amount of stain adhering to the detecting section of the temperature sensor 742.

Subsequently, a relation between the difference t between the center WAE estimation value ct and the side WAE estimation value st and a rise in an actual temperature in the heat roller 71 (the center region C and the side region S) is explained.

Figure 9:
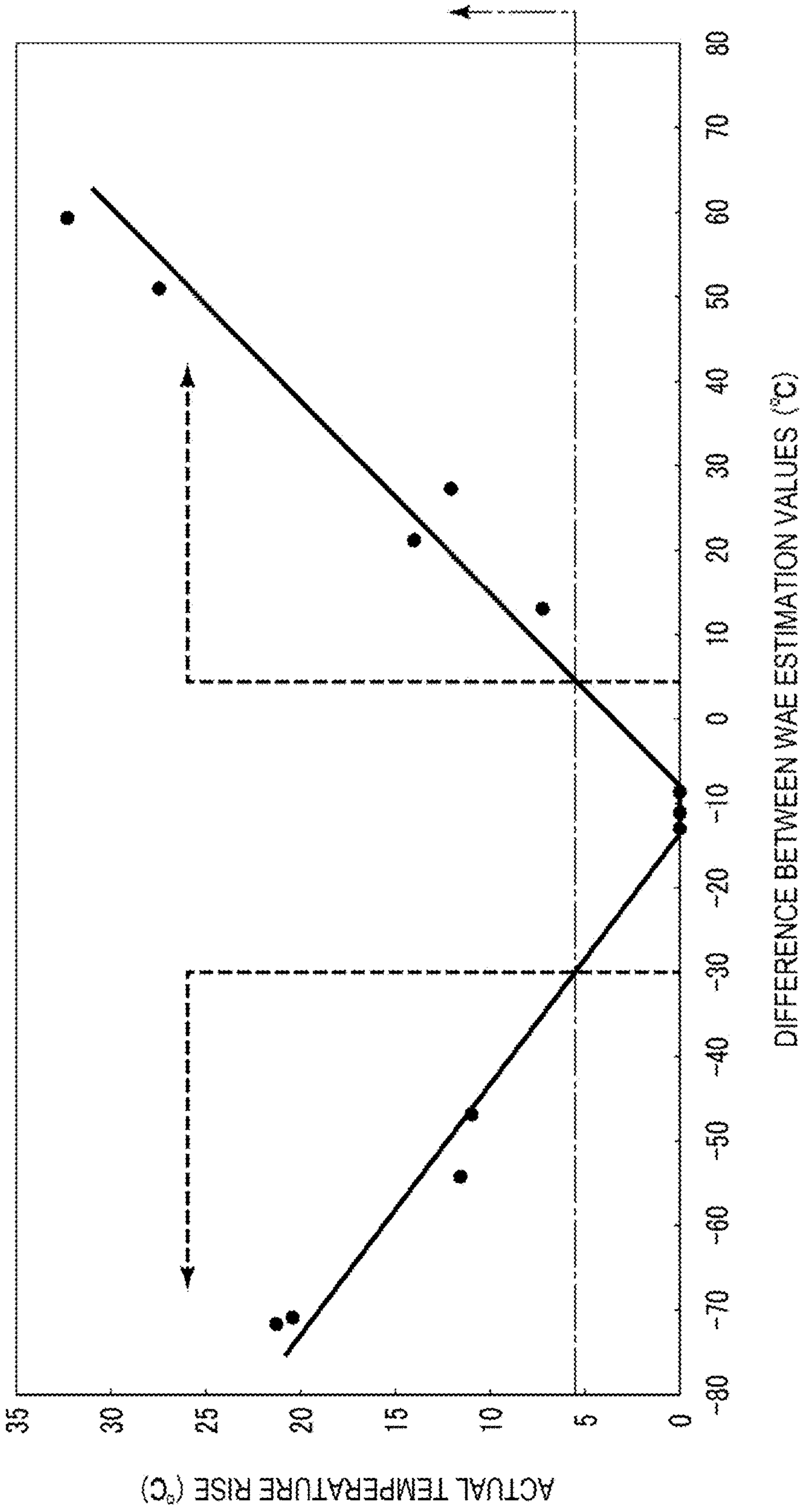
FIG. 9 is a diagram illustrating a relation between a difference between a center WAE estimation value and a side WAE estimation value and a rise in an actual temperature in a heat roller in the fixing device.

FIG. 9 is a diagram illustrating a relation (a function) between the difference t between the center WAE estimation value ct and the side WAE estimation value st and a rise in an actual temperature in the heat roller 71.

FIG. 9 illustrates a function representing a relation between a difference between WAE estimation values obtained from values calculated based on the measurement results illustrated in FIGS. 5 to 8 explained above and a rise in an actual temperature. That is, FIG. 9 illustrates a relation between the difference t between the center WAE estimation value ct and the side WAE estimation value st and a rise in an actual temperature (a rising value of an actual temperature) of the heat roller 71 in the last twenty seconds in the case in which the left in ready continued for one minute. It is assumed that the rise in the actual temperature means a temperature difference between temperature detected by the temperature sensor 74 and the actual temperature of the heat roller 71.

It is assumed that the difference(a difference between WAE estimation values) t between the center WAE estimation value ct and the side WAE estimation value st is a value (t=ct−st) obtained by subtracting the side WAE estimation value st from the center WAE estimation value ct. FIG. 9 illustrates a rise in an actual temperature of the center region C if the difference t between the WAE estimation values is approximately −8° C. or more and illustrates a rise in an actual temperature of the side region S if the difference t between the WAE estimation values is approximately −14° C. or less.

Figure 10:
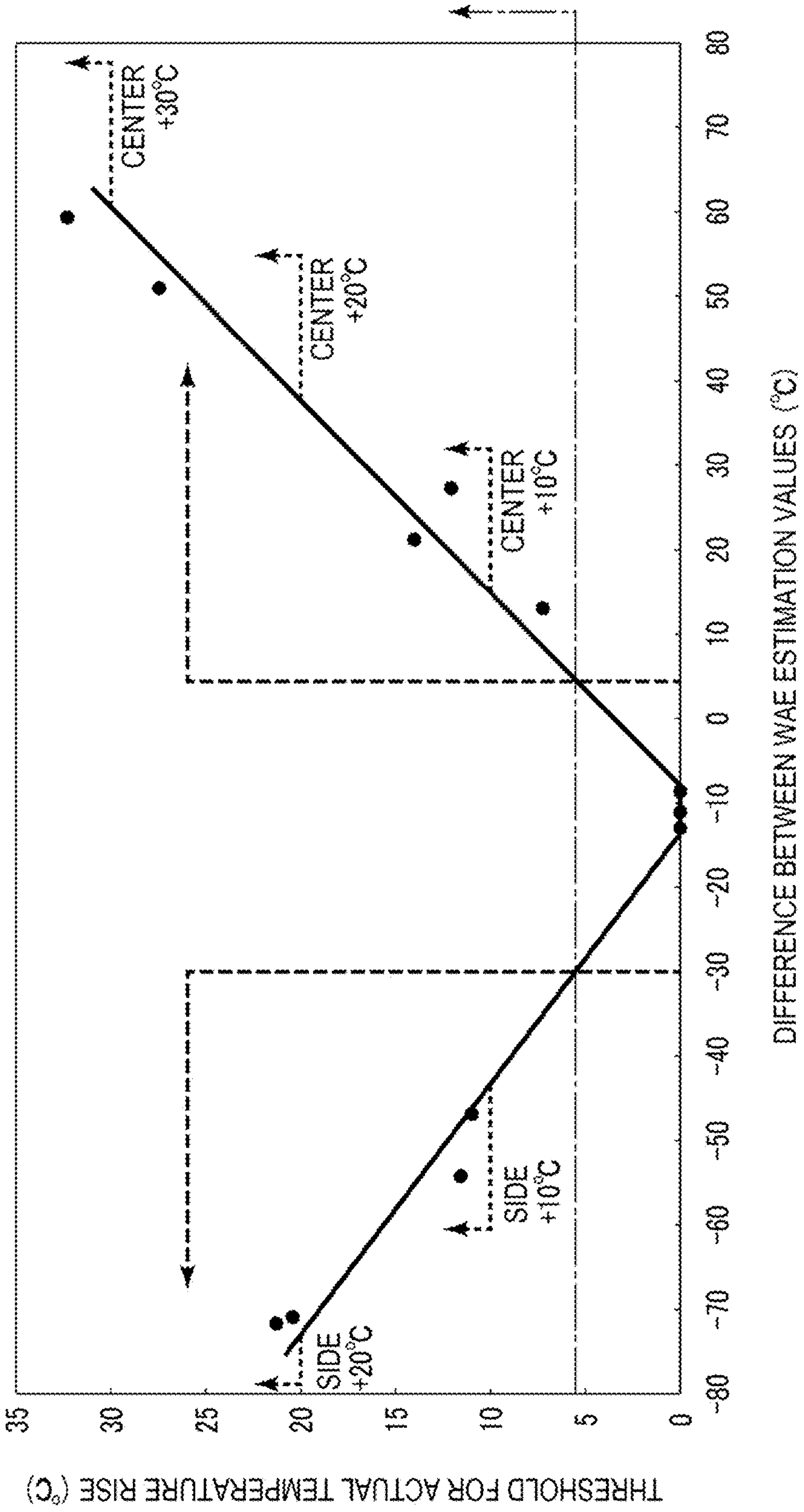
FIG. 10 is a diagram illustrating an example of a threshold for estimating rises in actual temperatures in a center region and a side region of the heat roller based on a function illustrated in FIG. 9.

FIG. 10 is a diagram illustrating a determination example in which rises in actual temperatures in the center region C and the side region S are determined based on the function illustrated in FIG. 9.

In the example illustrated in FIG. 10, it is determined that the rise in the actual temperature of the center region C is 30° C. if the difference t between the WAE estimation values is 60° C. or more. It is determined that the rise in the actual temperature of the center region C is 20° C. if the difference t between the WAE estimation values is 37° C. or more and less than 60° C. It is determined that the rise in the actual temperature of the center region C is 10° C. if the difference t between the WAE estimation values is 15° C. or more and less than 37° C.

It is determined that the rise in the actual temperature of the center region C is in a normal range if the difference t between the WAE estimation values is in a range of −43° C. to less than 15° C. It is determined that the rise in the actual temperature of the center region C is 10° C. if the difference t between the WAE estimation values is in a range of −43° C. or less to −73° C. It is determined that the rise in the actual temperature of the center region C is 20° C. if the difference t between the WAE estimation values is −73° C. or less.

FIG. 11 is a diagram illustrating a table in which determination results of rises in actual temperatures with respect to the difference (the difference between the WAE estimation values) t of the center WAE estimation value ct and the side WAE estimation value st illustrated in FIG. 10 are collected.

In the table illustrated in FIG. 11, information indicating values of the rises in the actual temperatures with respect to the difference t between the WAE estimation values is stored. The table illustrated in FIG. 11 is saved in, for example, the data memory 84. The information illustrated in FIG. 11 is the same as the information illustrated in FIG. 10 explained above.

That is, according to the table illustrated in FIG. 11, if the difference t between the WAE estimation values is 60° C. or more (60≥t), it is determined (estimated) that the rise in the actual temperature of the center region C is 30° C. If the difference t between the WAE estimation values is in a range of 37° C. or more and less than 60° C. (37≤t<60), it is determined that the rise in the actual temperature of the center region C is 20° C. If the difference t between the WAE estimation values is in a range of 15° C. or more and less than 37° C. (15≤t<37), it is determined that the rise in the actual temperature of the center region C is 10° C.

If the difference t between the WAE estimation values is in a range of −43° C. to less than 15° C. (15<t<−43), it is determined that the rise in the actual temperature of the center region C is in a normal range. If the difference t between the WAE estimation values is in a range of −43° C. or less to −73° C. (−43≥t>−73), it is determined that the rise in the actual temperature of the center region C is 10° C. If the difference t between the WAE estimation values is −73° C. or less (−73≥t), it is determined that the rise in the actual temperature of the center region C is 20° C.

The image forming apparatus 1 and the fixing unit 21 according to the embodiment refer to the table illustrated in FIG. 11 to thereby determine a value of a rise in an actual temperature with respect to the difference t between the center WAE estimation value and the side WAE estimation value. For example, the controller 13 acquires the center WAE estimation value ct and the side WAE estimation value st in the last twenty seconds in the case in which the left in stay continued for a predetermined time (for example, one minute). The controller 13 calculates the difference t between the WAE estimation values from a difference between the center WAE estimation value ct and the side WAE estimation value st. The controller 13 specifies, based on the table illustrated in FIG. 11, a rise in an actual temperature corresponding to the calculated difference t between the WAE estimation values.

Subsequently, an operation of failure prediction processing in the image forming apparatus 1 including the fixing unit 21 according to the embodiment is explained.

Figure 12:
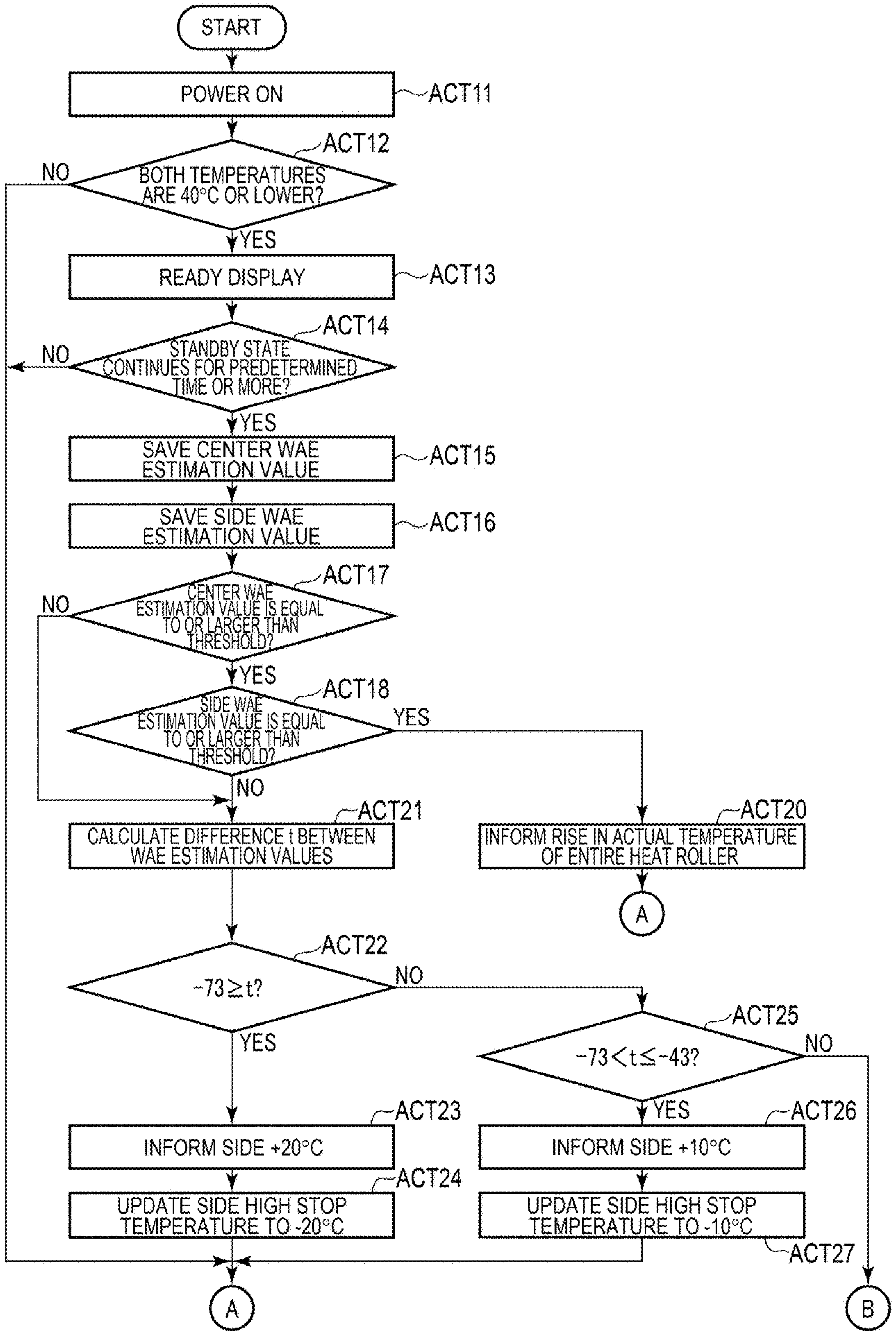
FIG. 12 is a flowchart for explaining an operation example of failure prediction processing in the image forming apparatus including the fixing device.
Figure 13:
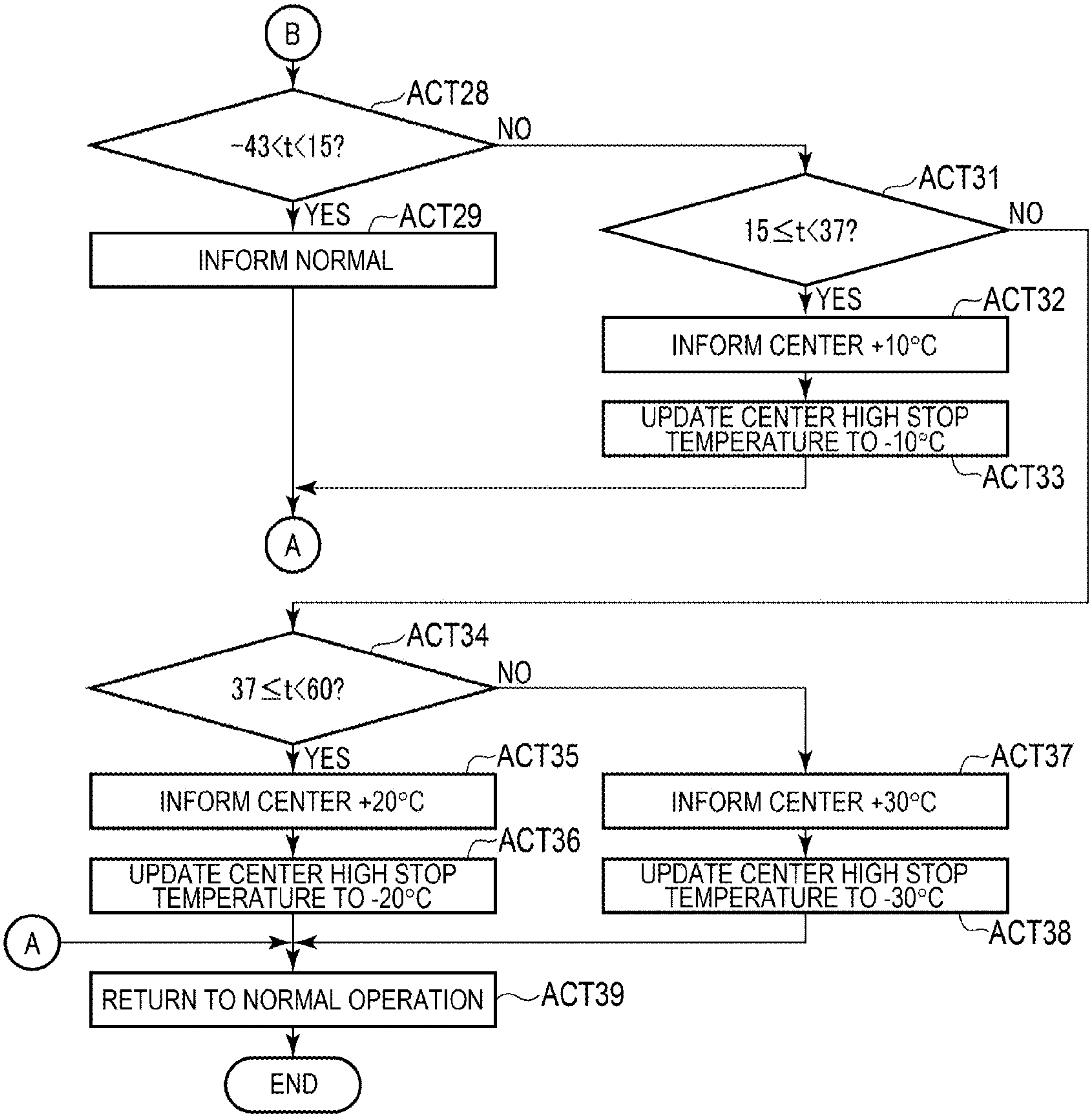
FIG. 13 is a flowchart for explaining the operation example of the failure prediction processing in the image forming apparatus including the fixing device.

FIGS. 12 and 13 are flowcharts for explaining an operation example of the failure prediction processing in the image forming apparatus 1 including the fixing unit 21 according to the embodiment.

For example, the processor 81 executes a program for the failure prediction processing, whereby the controller 13 performs the failure prediction processing. It is assumed that the program for the failure prediction processing to be executed by the processor 81 is stored in a nonvolatile memory such as the ROM 82 or the data memory 84.

First, the controller 13 turns on the entire image forming apparatus 1 (ACT 11). If the entire apparatus is turned on, the controller 13 acquires temperature detected by the temperature sensor 741 and temperature detected by the temperature sensor 742. The controller 13 checks whether both of the detected temperature of the temperature sensor 741 and the detected temperature of the temperature sensor 742 are 40° C. or lower (ACT 12).

If the detected temperature of the temperature sensor 741 or the detected temperature of the temperature sensor 742 exceeds 40° C. (NO in ACT 12), the controller 13 omits the failure prediction processing. If omitting the failure prediction processing, the controller 13 proceeds to ACT 39 and shifts to a normal operation.

If both of the detected temperature of the temperature sensor 741 and the detected temperature of the temperature sensor 742 are 40° C. or lower (YES in ACT 12), the controller 13 executes a warmup operation. If the warmup operation is completed, the controller 13 shifts to the ready state and displays, on the display device 15, guidance (ready indication) indicating the ready state (ACT 13).

The controller 13 counts a time in which the ready state (a standby state) continues after the controller 13 shifts to the ready state (a continuation time of the left in ready). The controller 13 determines whether the counted continuation time of the left in ready is a predetermined time (for example, one minute) or more (ACT 14). While continuing the ready state (the left in ready), the controller 13 retains, in a memory such as the RAM 83, an estimation value (the center WAE estimation value ct) of temperature of the center region C and an estimation value (the side WAE estimation value st) of temperature of the side region S in the heat roller 71.

In this embodiment, the controller 13 saves, in the memory, a center WAE estimation value and a side WAE estimation value in a predetermined measurement time in a period in which the ready state continues. It is assumed that the predetermined measurement time is, for example, the last twenty seconds (a time from 40 seconds to 60 seconds after the controller 13 shifts to the ready state) in the case in which the ready state continued for one minute.

If the continuation time of the left in ready is not the predetermined time or more (NO in ACT 14), the controller 13 omits the failure prediction and returns to the normal operation (ACT 39). For example, if starting printing before the continuation time of the left in ready is the predetermined time or more, the controller 13 omits the failure prediction and executes a print operation.

If the continuation time of the left in ready is the predetermined time or more (YES in ACT 14), the controller 13 saves a center WAE estimation value and a side WAE estimation value in the last predetermined period (for example, the last twenty seconds) in the predetermined time (one minute) in which the left in ready continued (ACTs 15 and 16). For example, the controller 13 acquires information indicating a center WAE estimation value and a side WAE estimation value in a period of the last twenty seconds (40 seconds to 60 seconds after the controller 13 starts the left in ready) in one minute in which the left in ready continued.

The controller 13 calculates an average value of center WAE estimation values in a predetermined period during the left in ready. The controller 13 saves the calculated average value of the center WAE estimation values in the predetermined period during the left in ready in the RAM 83 or the data memory 84 as a center WAE estimation value (ACT 15).

The controller 13 calculates an average value of side WAE estimation values in the predetermined period during the left in ready. The controller 13 saves the calculated average value of the side WAE estimation values in the RAM 83 or the data memory 84 as a side WAE estimation value (ACT 16).

After saving the center WAE estimation value and the side WAE estimation value, the controller 13 determines whether the center WAE estimation value is equal to or larger than a center upper limit value (a first upper limit value) (ACT 17). If the center WAE estimation value is equal to or larger than the center upper limit value (YES in ACT 17), the controller 13 further determines whether the side WAE estimation value is equal to or larger than a side upper limit value (a second upper limit value) (ACT 18). If the side WAE estimation value is equal to or larger than the side upper limit value (YES in ACT 18), the controller 13 informs that an actual temperature of the entire heat roller 71 is likely to have risen (ACT 20).

That is, if the center WAE estimation value is equal to or larger than the center upper limit value (for example, 190° C.) and the side WAE estimation value is equal to or larger than the side upper limit value (for example, 180° C.), since the actual temperature of the entire heat roller 71 greatly rose with respect to a control target, the controller 13 informs that both of the temperature sensor 741 and the temperature sensor 742 are likely to be stained.

For example, if both of the center WAE estimation value and the side WAE estimation value are equal to or larger than the upper limit values, the controller 13 outputs, to a serviceman or the like, via the communication interface 12, information indicating that the actual temperature is likely to have risen or indicating that the entire heat roller 71 (the detecting sections of the temperature sensors in contact with the heat roller 71) is stained. The controller 13 may display, on the display device 15, information indicating that the actual temperature is likely to have risen or the entire heat roller 71 is stained. After informing that the actual temperature rose or the entire heat roller 71 is stained, the controller 13 proceeds to ACT 39 and shifts to the normal operation.

If the center WAE estimation value is not equal to or larger than the center upper limit value (NO in ACT 17) or if the side WAE estimation value is not equal to or larger than the side upper limit value (NO in ACT 18), the controller 13 calculates the difference t between the center WAE estimation value ct and the side WAE estimation value st (ACT 21). For example, the processor 81 of the controller 13 reads out the center WAE estimation value ct and the side WAE estimation value st in the ready state saved in the RAM 83 (or the data memory 84). The processor 81 subtracts the side WAE estimation value st from the center WAE estimation value ct to thereby calculate the difference t between the WAE estimation values.

After calculating the difference t between the WAE estimation values, the controller 13 determines (estimates) a rise in an actual temperature corresponding to the difference t between the WAE estimation values. For example, the processor 81 of the controller 13 refers to the table illustrated in FIG. 11 to thereby determine rises in actual temperatures in regions corresponding to the difference t between the WAE estimation values. In FIGS. 12 and 13, as an example, an example is illustrated in which a rise in an actual temperature is determined based on the table illustrated in FIG. 11. A processing example corresponding to a rise in an actual temperature estimated based on the table illustrated in FIG. 11 is explained.

The controller 13 refers to the table illustrated in FIG. 11 and determines whether the difference t between the WAE estimation values is −73° C. (a first threshold) or less (ACT 22). If the difference t between the WAE estimation values is −73° C. or less (YES in ACT 22), the controller 13 determines (estimates) according to the table illustrated in FIG. 11 that an actual temperature rose 20° C. (20° C. or higher) in the side region S of the heat roller 71.

If −73≥t, the controller 13 informs that the actual temperature of the side region S is likely to have risen 20° C. or higher with respect to the control target (ACT 23). For example, the controller 13 informs, via the communication interface 12, the serviceperson that the actual temperature of the side region S is likely to have risen 20° C. or higher. The controller 13 may display, on the display device 15, for example, information indicating that the actual temperature of the side region S is likely to have risen 20° C. or higher or the detecting section of the temperature sensor 742 in the side region S is likely to be stained.

If determining that the actual temperature of the side region S rose 20° C. or higher, the controller 13 updates a high stop temperature of the side region S to −20° C. (ACT 24). The controller 13 and the heater control circuit 14 set the side heater 732 to be forcibly turned off if temperature detected by the temperature sensor 742 exceeds the high stop temperature (a side high stop temperature).

That is, the controller 13 and the heater control circuit 14 update a setting value of the side high stop temperature to −20° C. if determining that the actual temperature of the side region S rose 20° C. or higher. Consequently, the image forming apparatus 1 is capable of preventing an abnormal temperature rise of the side region S with setting corresponding to the actual temperature.

After informing the rise in the actual temperature and updating the side high stop temperature according to the rise in the actual temperature, the controller 13 proceeds to ACT 39 and shifts to the normal operation.

If the difference t between the WAE estimation values is not −73° C. or less (NO in ACT 22), the controller 13 determines whether the difference t between the WAE estimation values is −73<t≤−43 (a second threshold) (ACT 25). If the difference t between the WAE estimation values is −73<t≤−43 (YES in ACT 25), the controller 13 determines (estimates) according to the table illustrated in FIG. 11 that the actual temperature rose 10° C. (10° C. or higher) in the side region S of the heat roller 71.

If −73<t≤−43, the controller 13 informs, via the communication interface 12, that the actual temperature of the side region S is likely to have risen 10° C. or higher (ACT 26). For example, the controller 13 informs, via the communication interface 12, the serviceperson that the actual temperature of the side region S is likely to have risen 10° C. or higher. The controller 13 may display, on the display device 15, for example, information indicating that the actual temperature of the side region S is likely to have risen 10° C. or higher or the detecting section of the temperature sensor 742 in the side region S is likely to be stained.

If determining that the actual temperature of the side region S rose 10° C. or higher, the controller 13 updates the high stop temperature of the side region S to a value reduced by 10° C. (ACT 27). If determining that the actual temperature of the side region S rose 10° C., the controller 13 and/or the heater control circuit 14 updates the setting value of the side high stop temperature to −10° C. Consequently, the image forming apparatus 1 can prevent an abnormal temperature rise of the side region S with the setting corresponding to the actual temperature.

After informing the rise in the actual temperature and updating the side high stop temperature according to the rise in the actual temperature, the controller 13 proceeds to ACT 39 and shifts to the normal operation.

If the difference t between the WAE estimation values is not −73<t≤−43 (NO in ACT 25), the controller 13 determines whether the difference t between the WAE estimation values is −43<t<15 (a third threshold) (ACT 28). If the difference t between the WAE estimation values is −43<t<15 (YES in ACT 28), the controller 13 determines (specifies) according to the table illustrated in FIG. 11 that the actual temperature of the heat roller 71 is in a normal range.

If −43<t<15 (the actual temperature of the heat roller is in the normal range), the controller 13 informs that the actual temperature of the heat roller 71 is in the normal range (ACT 29). For example, the controller 13 informs, via the communication interface 12, the serviceperson that the actual temperature of the heat roller 71 is in the normal range. The controller 13 may inform nothing. After informing that the actual temperature is in the normal range (or without informing processing), the controller 13 proceeds to ACT 39 and shifts to the normal operation.

If the difference t between the WAE estimation values is not −43<t<15 (NO in ACT 28), the controller 13 determines whether the difference t between the WAE estimation values is 15≤t<37 (a fourth threshold) (ACT 31). If the difference t between the WAE estimation values is 15≤t<37 (YES in ACT 31), the controller 13 determines (estimates) according to the table illustrated in FIG. 11 that the actual temperature rose 10° C. (10° C. or higher) in the center region C of the heat roller 71.

If 15≤t<37, the controller 13 informs that the actual temperature of the center region C is likely to have risen 10° C. or higher (ACT 32). For example, the controller 13 informs, via the communication interface 12, the serviceperson that the actual temperature of the center region C is likely to have risen 10° C. or higher. The controller 13 may display, on the display device 15, for example, information indicating that the actual temperature of the center region C is likely to have risen 10° C. or higher or the detecting section of the temperature sensor 741 in the center region C is likely to be stained.

If determining that the actual temperature of the center region C rose 10° C. or higher, the controller 13 updates the high stop temperature of the center region C to a value reduced by 10° C. (ACT 33). If determining that the actual temperature of the center region C rose 10° C. or higher, the controller 13 and/or the heater control circuit 14 updates a setting value of the center high stop temperature to −10° C. Consequently, the image forming apparatus 1 can prevent an abnormal temperature rise of the center region C with the setting corresponding to the actual temperature.

After informing the rise in the actual temperature and updating the side high stop temperature according to the rise in the actual temperature, the controller 13 proceeds to ACT 39 and shifts to the normal operation.

If the difference t between the WAE estimation values is not 15≤t<37 (NO in ACT 31), the controller 13 determines whether the difference t between the WAE estimation values is 37≤t<60 (a fifth threshold) (ACT 34). If the difference t between the WAE estimation values is 37≤t<60 (YES in ACT 34), the controller 13 determines (specifies) according to the table illustrated in FIG. 11 that the actual temperature rose 20° C. (20° C. or higher) in the center region C of the heat roller 71.

If 37≤t<60, the controller 13 informs that the actual temperature of the center region C is likely to have risen 20° C. or higher (ACT 35). For example, the controller 13 informs, via the communication interface 12, the serviceperson that the actual temperature of the center region C rose 20° C. or higher. The controller 13 may display, on the display device 15, for example, information indicating that the actual temperature of the center region C is likely to have risen 20° C. or higher or the detecting section of the temperature sensor 741 in the center region C is likely to be stained.

If determining that the actual temperature of the center region C rose 20° C., the controller 13 updates the high stop temperature of the center region C to a value reduced by 20° C. (ACT 36). If determining that the actual temperature of the center region C rose 20° C., the controller 13 and/or the heater control circuit 14 updates the setting value of the center high stop temperature to −20° C. Consequently, the image forming apparatus 1 can prevent an abnormal temperature rise of the center region C with the setting corresponding to the actual temperature.

After informing the rise in the actual temperature and updating the center high stop temperature according to the rise in the actual temperature, the controller 13 proceeds to ACT 39 and shifts to the normal operation.

If the difference t between the WAE estimation values is not 37≤t<60 (NO in ACT 34), that is, if the difference t between the WAE estimation values is 60≤t, the controller 13 determines (specifies) according to the table illustrated in FIG. 11 that the actual temperature rose 30° C. (30° C. or higher) in the center region C of the heat roller 71.

If 60≤t, the controller 13 informs that the actual temperature of the center region C is likely to have risen 30° C. or higher (ACT 37). For example, the controller 13 informs, via the communication interface 12, the serviceperson that the actual temperature of the center region C is likely to have risen 30° C. or higher. The controller 13 may display, on the display device 15, for example, information indicating that the actual temperature of the center region C is likely to have risen 30° C. or higher or the detecting section of the temperature sensor 741 in the center region C is likely to be stained.

If determining that the actual temperature of the center region C rose 30° C., the controller 13 updates the high stop temperature of the center region C to a value reduced by 30° C. (ACT 38). If determining that the actual temperature of the center region C rose 30° C., the controller 13 and/or the heater control circuit 14 updates the setting value of the center high stop temperature to −30° C. Consequently, the image forming apparatus 1 can prevent an abnormal temperature rise of the center region C with the setting corresponding to the actual temperature.

After informing the rise in the actual temperature and updating the side high stop temperature according to the rise in the actual temperature, the controller 13 proceeds to ACT 39 and shifts to the normal operation.

As explained above, the image forming apparatus including the fixing unit according to the embodiment predicts the actual temperature corresponding to the stain in the detecting section of the temperature sensor from the WAE estimation values in the left in ready state. The image forming apparatus informs the serviceperson or the like of the prediction result of the actual temperature corresponding to the stain in the detecting section of the temperature sensor. Consequently, it is possible to inform that the image forming apparatus is controlled at an actual temperature higher than the control target because of the stain in the detecting section of the temperature sensor. As a result, the serviceperson is capable of taking measures before a failure due to deterioration or breakage of various members by use at high temperature occurs. It is possible to prevent downtime due to the failure.

In the embodiment explained above, the image forming apparatus 1 including the fixing unit 21 in the configuration example illustrated in FIGS. 1 and 2 is explained. However, a configuration of the fixing unit applied to the image forming apparatus 1 according to the embodiment is not limited to the first configuration example illustrated in FIGS. 1 and 2. Not only the fixing unit 21 in the first configuration example but also fixing units in second to fifth configuration examples explained below can be applied to the image forming apparatus 1 according to the embodiment.

Modifications of the fixing unit applicable to the image forming apparatus 1 according to the embodiment are explained below.

First, a fixing unit 200 that is a second example of the fixing unit applicable to the image forming apparatus 1 according to the embodiment is explained.

Figure 14:
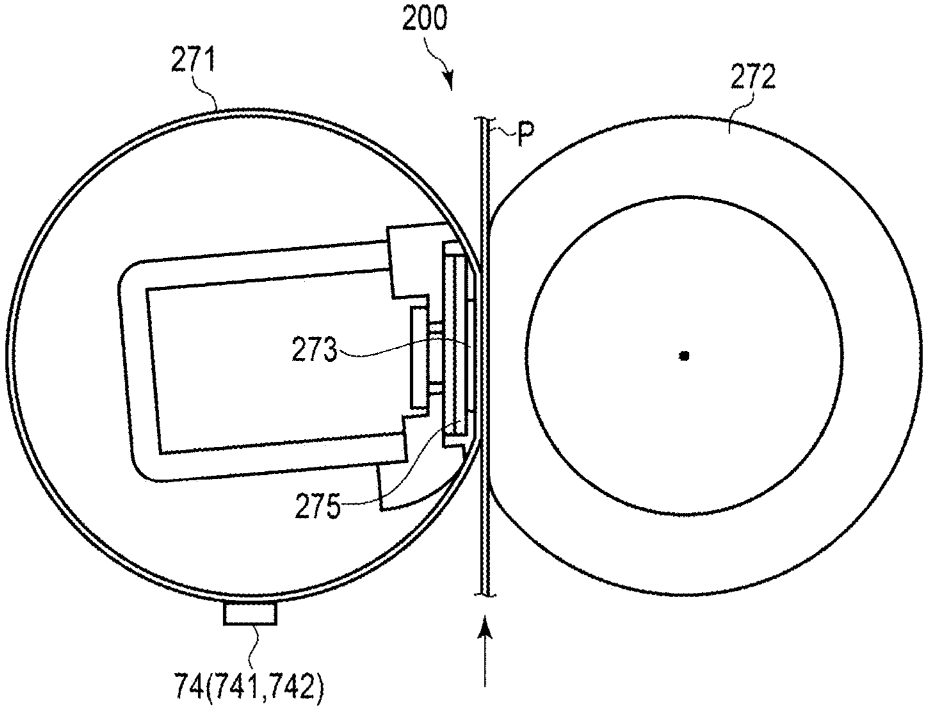
FIG. 14 is a diagram illustrating a second configuration example of a fixing unit used in the fixing device.
Figure 15:
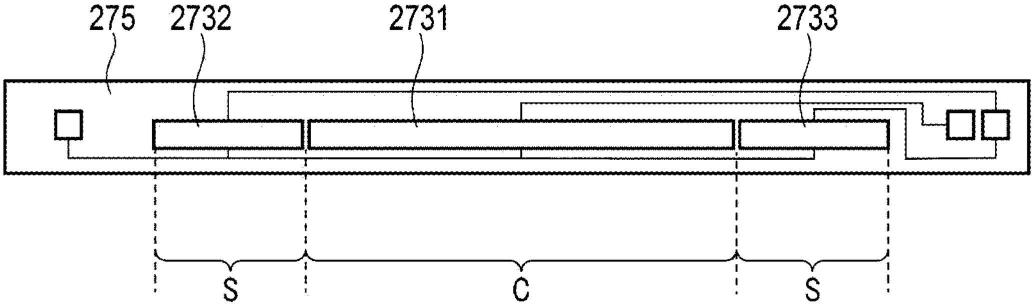
FIG. 15 is a diagram illustrating a configuration example of a heater unit in the fixing unit in the second configuration example used in the fixing device.

FIG. 14 is a diagram illustrating a configuration example of the fixing unit 200 that is the second example of the fixing unit applicable to the image forming apparatus 1 according to the embodiment. FIG. 15 is a diagram illustrating a configuration example of a heater unit in the fixing unit 200.

As illustrated in FIG. 14, the fixing unit 200 includes the temperature sensor 74 (741, 742), a tubular film 271 functioning as a fixing member, a pressurizing roller 272, a heat generating body 273, a heat generating body substrate 275, and the like. The pressurizing roller 272 forms a nip between the pressurizing roller 272 and the tubular film 271. The tubular film 271 and the pressurizing roller 272 heat the printing medium P, which enters the nip, while pressurizing the printing medium P.

The heater unit includes the heat generating body 273 and the heat generating body substrate 275. The heat generating body substrate 275 is formed by a metal material, a ceramic material, or the like. The heat generating body substrate 275 is formed in an elongated rectangular plate shape. The heat generating body substrate 275 is disposed on the inner side in the radial direction of the tubular film 271. The heat generating body substrate 275 has the axial direction of the tubular film 271 as a longitudinal direction.

The heat generating body 273 includes a center heat generating body 2731, a first end heat generating body 2732, and a second end heat generating body 2733. The three heat generating bodies 2731, 2732, and 2733 are disposed side by side in a direction orthogonal to the paper conveyance direction (in the longitudinal direction of the heat generating body substrate 275). The center heat generating body 2731 is disposed to match the center position in the width direction of the printing medium P passing through the nip (the direction orthogonal to the conveyance direction). The first end heat generating body 2732 and the second end heat generating body 2733 are disposed side by side on both the sides of the center heat generating body 2731.

The center heat generating body 2731 is an example of the first heat source. As illustrated in FIG. 15, the center heat generating body 2731 supplies heat with the center region C as the center in the direction orthogonal to the paper conveyance direction. However, even if only the center heat generating body 2731 is caused to generate heat, the temperature of the side region S rises. The first end heat generating body 2732 and the second end heat generating body 2733 are an example of the second heat source. As illustrated in FIG. 15, the first end heat generating body 2732 and the second end heat generating body 2733 supply heat with the side region S as the center in the direction orthogonal to the paper conveyance direction.

As in the first configuration example, the temperature sensors 741 and 742 are contact-type temperature detecting devices such as thermistors. The temperature sensor 741 detects the temperature of a position corresponding to the center region C heated by the center heat generating body 2731. The temperature sensor 742 detects the temperature of a position corresponding to the side region S heated by the end heat generating body 2732 or 2733.

As explained above, the WAE control explained above is possible also for the fixing unit 200 illustrated in FIGS. 14 and 15. Therefore, the failure prediction processing using the WAE estimation values explained above can be implemented also for the image forming apparatus 1 including the fixing unit 200 illustrated in FIGS. 14 and 15. However, the setting values of the table illustrated in FIG. 11 cannot be directly applied to the image forming apparatus 1 including the fixing unit 200. The information indicating the rise in the actual temperature corresponding to the difference between the center WAE estimation value and the side WAE estimation value as in the table illustrated in FIG. 11 needs to be set for each machine body of the image forming apparatus 1.

For example, in the image forming apparatus 1 including the fixing unit 200, measurement of the characteristics illustrated in FIGS. 5 to 10 is implemented. A rise in an actual temperature corresponding to a difference between a center WAE estimation value and a side WAE estimation value is set based on a measurement result of the characteristics in the image forming apparatus 1 including the fixing unit 200. The image forming apparatus 1 including the fixing unit 200 stores (sets), in the memory, information indicating the rise in the actual temperature corresponding to the difference between the center WAE estimation value and the side WAE estimation value. Consequently, the failure prediction processing explained above can be implemented also for the image forming apparatus 1 including the fixing unit 200.

Subsequently, a fixing unit 300 that is a third example of the fixing unit applicable to the image forming apparatus 1 according to the embodiment is explained.

Figure 16:
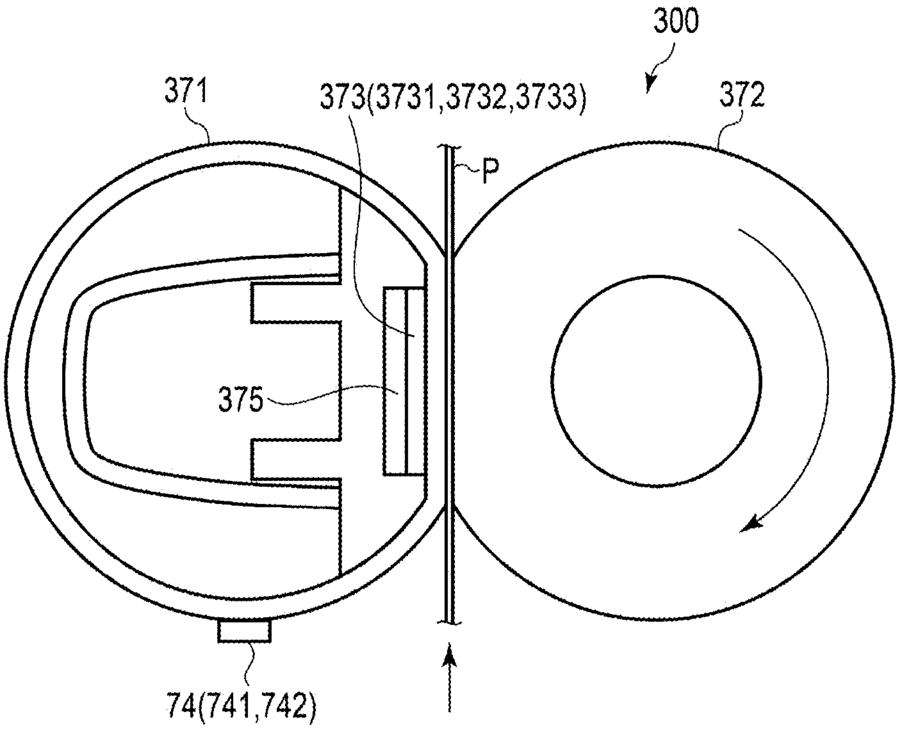
FIG. 16 is a diagram illustrating a third configuration example of a fixing unit used in the fixing device.
Figure 17:
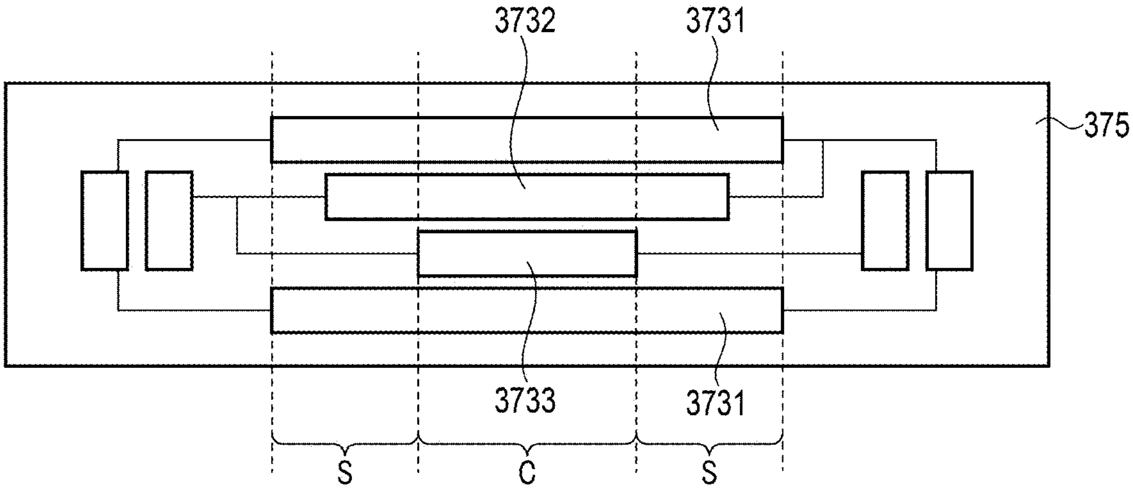
FIG. 17 is a diagram illustrating a configuration example of a heater unit in the fixing unit in the third configuration example used in the fixing device.

FIG. 16 is a diagram illustrating a configuration example of the fixing unit 300 that is the third example of the fixing unit applicable to the image forming apparatus 1 according to the embodiment. FIG. 17 is a diagram illustrating a configuration example of a heater unit in the fixing unit 300.

As illustrated in FIG. 16, the fixing unit 300 includes the temperature sensor 74 (741, 742), a tubular film 371 functioning as a fixing member (a fixing rotating body), a pressurizing roller 372, a heat generating body 373, a heat generating body substrate 375, and the like. The pressurizing roller 372 forms a nip between the pressurizing roller 372 and the tubular film 371. The tubular film 371 and the pressurizing roller 372 heat the printing medium P, which enters the nip, while pressurizing the printing medium P.

The heater unit includes the heat generating body 373 and the heat generating body substrate 375. The heat generating body substrate 375 is formed by a metal material, a ceramic material, or the like. The heat generating body substrate 375 is formed in an elongated rectangular plate shape. The heat generating body substrate 375 is disposed on the inner side in the radial direction of the tubular film 371. The heat generating body substrate 375 has the axial direction of the tubular film 371 as a longitudinal direction.

The heat generating body 373 includes a plurality of heat generating bodies 3731, 3732, and 3733. The heat generating body 373 is provided in contact with the inner surface of the tubular film 371 in a state in which the heat generating body 373 is disposed on the heat generating body substrate 375. The heat generating bodies 3731, 3732, and 3733 are resistors that generate heat with power supply from an AC power supply.

The heat generating bodies 3731 are used to fix toner on the printing medium P having the largest width (paper width) in the direction orthogonal to the conveyance direction. The heat generating bodies 3731 have width corresponding to the largest paper width. The heat generating bodies 3731 are disposed on an upstream side and a downstream side in the conveyance direction of the printing medium P on the heat generating body substrate 375.

The heat generating body 3732 is a heat generating body shorter than the heat generating bodies 3731 in the direction orthogonal to the conveyance direction of the printing medium P. The heat generating body 3733 is a heat generating body shorter than the heat generating body 3732 in the direction orthogonal to the conveyance direction of the printing medium P. The heat generating bodies 3731 are main heaters and the heat generating bodies 3732 and 3733 are sub-heaters. ON and OFF of the main heaters and the sub-heaters are controlled according to the paper width of the printing medium P.

As explained above, the WAE control is possible also for the fixing unit 300 illustrated in FIGS. 16 and 17. Therefore, the image forming apparatus 1 including the fixing unit 300 illustrated in FIGS. 16 and 17 can implement the failure prediction processing using the WAE estimation values explained above. The image forming apparatus 1 including the fixing unit 300 needs to set information indicating the rise in the actual temperature corresponding to the difference between the center WAE estimation value and the side WAE estimation value as in the table illustrated in FIG. 11. For example, the image forming apparatus 1 including the fixing unit 300 stores (sets), in the memory, based on a result of implementing measurement of the characteristics illustrated in FIGS. 5 to 10, information indicating the rise in the actual temperature corresponding to the difference between the center WAE estimation value and the side WAE estimation value. Consequently, the failure prediction processing explained above can be implemented also for the image forming apparatus 1 including the fixing unit 300.

Subsequently, a fixing unit 400 that is a fourth example of the fixing unit applicable to the image forming apparatus 1 according to the embodiment is explained.

Figure 18:
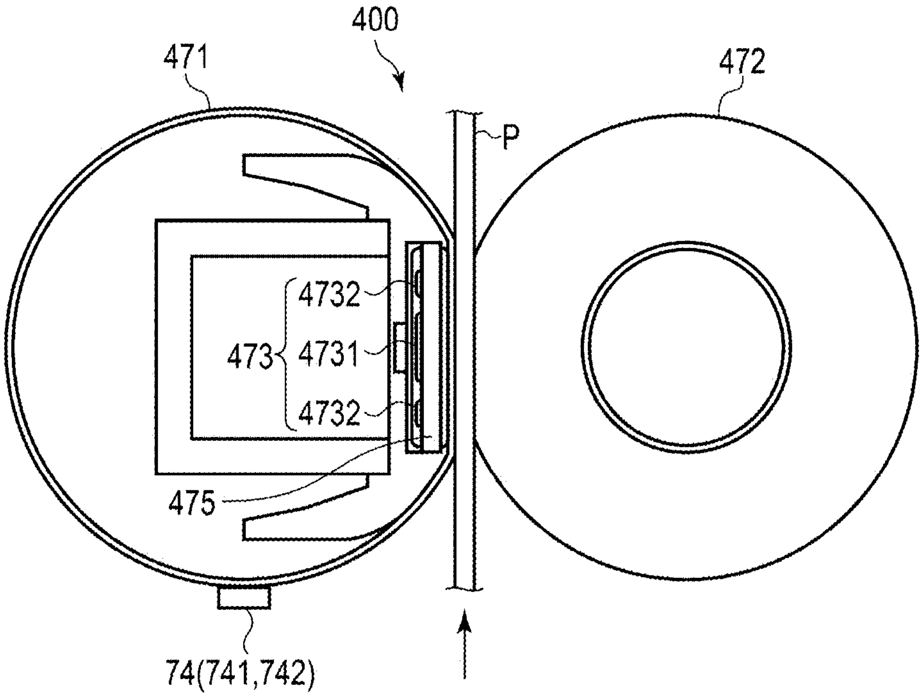
FIG. 18 is a diagram illustrating a fourth configuration example of a fixing unit used in the fixing device.
Figure 19:
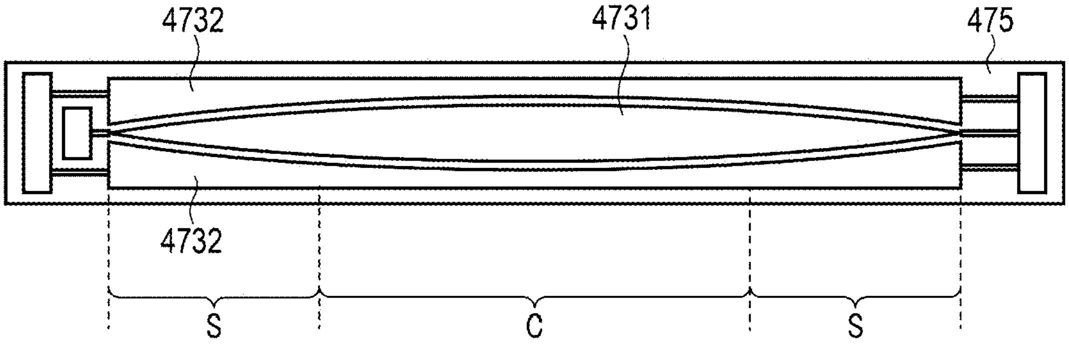
FIG. 19 is a diagram illustrating a configuration example of a heater unit in the fixing unit in the fourth configuration example used in the fixing device.

FIG. 18 is a diagram illustrating a configuration example of the fixing unit 400 that is the fourth example of the fixing unit applicable to the image forming apparatus 1 according to the embodiment. FIG. 19 is a diagram illustrating a configuration example of a heater unit in the fixing unit 400.

As illustrated in FIG. 18, the fixing unit 400 includes the temperature sensor 74 (741, 742), a tubular film 471 functioning as a fixing member (a fixing rotating body), a pressurizing roller 472, a heat generating body 473, a heat generating body substrate 475, and the like. The pressurizing roller 472 forms a nip between the pressurizing roller 472 and the tubular film 471. The tubular film 471 and the pressurizing roller 472 heat the printing medium P, which enters the nip, while pressurizing the printing medium P.

The heater unit includes a heat generating body 473 and a heat generating body substrate 475. The heat generating body substrate 475 is formed by a metal material or a ceramic material. The heat generating body substrate 475 is formed in an elongated rectangular plate shape. The heat generating body substrate 475 is disposed on the inner side in the radial direction of the tubular film 471. The heat generating body substrate 475 has the axial direction of the tubular film 471 as a longitudinal direction.

The heat generating body 473 includes a plurality of heat generating bodies 4731 and 4732. The heat generating body 473 is provided in contact with the inner surface of the tubular film 471 in a state in which the heat generating body 473 is disposed on the heat generating body substrate 475. The heat generating bodies 4731 and 4732 are, for example, resistors that generate heat with power supply from an AC power supply.

The heat generating body 4731 has width corresponding to the maximum width of the printing medium P in the direction orthogonal to the conveyance direction. As illustrated in FIG. 19, the heat generating body 4731 has large width with respect to the conveyance direction in the center in the direction orthogonal to the conveyance direction and has small width with respect to the conveyance direction at the end portion. The heat generating body 4731 is a main heater configured to intensively heat the center region C. The heat generating bodies 4732 have small width with respect to the conveyance direction in the center in the direction orthogonal to the conveyance direction and have large width with respect to the conveyance direction at the end. The heat generating bodies 4732 are sub-heaters configured to intensively heat the side regions S. ON and OFF of the main heater and the sub-heaters are controlled according to the paper width of the printing medium P.

As explained above, the WAE control explained above is possible also for the fixing unit 400 illustrated in FIGS. 18 and 19. Therefore, the image forming apparatus 1 including the fixing unit 400 illustrated in FIGS. 18 and 19 can implement the failure prediction processing using the WAE estimation values explained above. However, the image forming apparatus 1 including the fixing unit 400 needs to set information indicating the rise in the actual temperature corresponding to the difference between the center WAE estimation value and the side WAE estimation value as in the table illustrated in FIG. 11. The image forming apparatus 1 including the fixing unit 400 stores (sets), in the memory, based on a result of implementing measurement of the characteristics illustrated in FIGS. 5 to 10, information indicating the rise in the actual temperature corresponding to the difference between the center WAE estimation value and the side WAE estimation value. Consequently, the failure prediction processing explained above is implemented also for the image forming apparatus 1 including the fixing unit 400.

Subsequently, a fixing unit 500 that is a fifth example of the fixing unit applicable to the image forming apparatus 1 according to the embodiment is explained.

Figure 20:
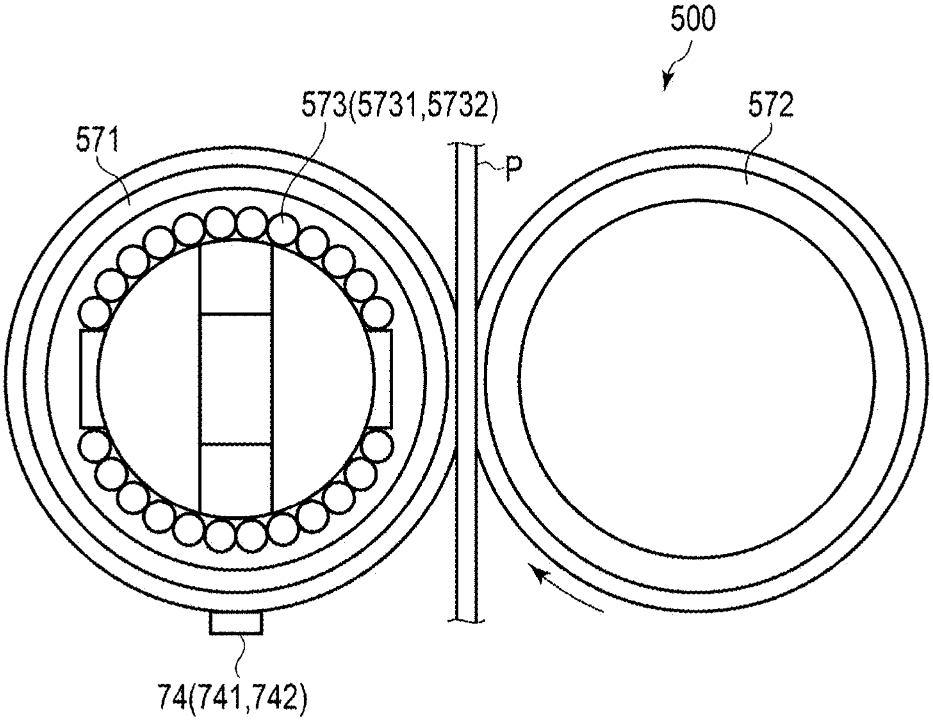
FIG. 20 is a diagram illustrating a fifth configuration example of a fixing unit used in the fixing device.
Figure 21:
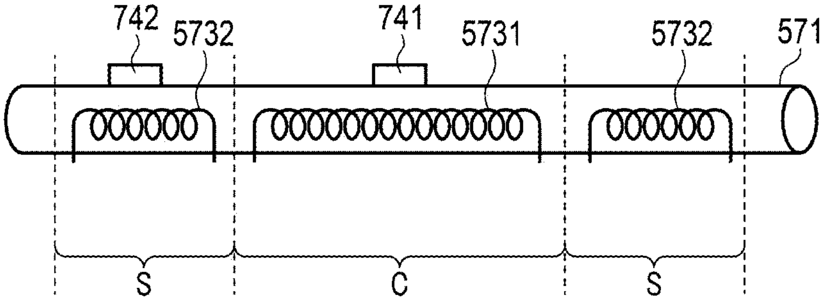
FIG. 21 is a diagram illustrating a configuration example of a heater unit in the fixing unit in the fifth configuration example used in the fixing device.

FIG. 20 is a diagram illustrating a configuration example of the fixing unit 500 that is the fifth example of the fixing unit applicable to the image forming apparatus 1 according to the embodiment. FIG. 21 is a diagram illustrating a configuration example of a heater unit in the fixing unit 500.

As illustrated in FIG. 20, the fixing unit 500 includes the temperature sensor 74 (741, 742), a heat roller 571 functioning as a fixing member, a pressurizing roller 572, an induction heating coil 573, and the like. The pressurizing roller 572 forms a nip between the pressurizing roller 572 and the heat roller 571. The heat roller 571 and the pressurizing roller 572 heat the printing medium P, which enters the nip, while pressurizing the printing medium P.

The induction heating coil 573 is an example of a heat source that heats the heat roller 571 functioning as the fixing member. The induction heating coil 573 includes a center coil 5731 and end coils 5732. The center coil 5731 and the end coils 5732 are disposed side by side in the direction orthogonal to the paper conveyance direction (a rotation axis direction of the heat roller 571) on the inside of the heat roller 571. The center coil 5731 is disposed to match the center position in the width direction of the printing medium P passing through the nip (the direction orthogonal to the conveyance direction). The end coils 5732 are disposed side by side on both sides of the center coil 5731.

The center coil 5731 is an example of the first heat source. As illustrated in FIG. 21, the center coil 5731 heats the center region C of the heat roller 571 in the direction orthogonal to the paper conveyance direction. The end coils 5732 are an example of the second heat source. As illustrated in FIG. 21, the end coils 5732 heat the side regions S of the heat roller 571 in the direction orthogonal to the paper conveyance direction.

As in the fixing unit 21 in the first configuration example, the temperature sensors 741 and 742 are contact-type temperature detecting devices such as thermistors. The temperature sensor 741 detects the temperature of the center region C of the heat roller 571. The temperature sensor 742 detects the temperature of the side region S of the heat roller 571.

As explained above, the WAE control explained above is possible also for the fixing unit 500 illustrated in FIGS. 20 and 21. Therefore, the image forming apparatus 1 including the fixing unit 500 illustrated in FIGS. 20 and 21 can implement the failure prediction processing using the WAE estimation values explained above. However, the image forming apparatus 1 including the fixing unit 500 needs to set information indicating the rise in the actual temperature corresponding to the difference between the center WAE estimation value and the side WAE estimation value as in the table illustrated in FIG. 11. The image forming apparatus 1 including the fixing unit 500 stores (sets), in the memory, based on a result of implementing measurement of the characteristics illustrated in FIGS. 5 to 10, information indicating the rise in the actual temperature corresponding to the difference between the center WAE estimation value and the side WAE estimation value. Consequently, the failure prediction processing explained above can be implemented also for the image forming apparatus 1 including the fixing unit 500.

The functions explained in the embodiments above is not limited to be configured using hardware and can also be realized by causing, using software, a computer to read programs describing the functions. The functions may be configured by selecting software or hardware as appropriate.

While certain embodiments have been described, these embodiments have been presented by way of example only, and are not intended to limit the scope of disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

What is claimed is:

1. An image forming apparatus comprising:

an image forming mechanism configured to form a developer image and transfer the formed developer image onto a medium;

a fixing unit including:

a fixing member that contacts the medium on which the developer image is transferred onto;

a heat source arranged to supply heat to the fixing member;

a first temperature sensor configured to detect a temperature of a first region in the fixing member; and a second temperature sensor configured to detect a temperature of a second region in the fixing member, and a controller configured to output information indicating an abnormality of the temperature detected by at least one of the first temperature sensor or the second temperature sensor, based on a difference between a first estimation value and a second estimation value, the first estimation value being an estimate of a temperature of the first region in the fixing member, and the second estimation value being an estimate of a temperature of the second region in the fixing member.

2. The image forming apparatus according to claim 1, wherein the controller is further configured to output information indicating an abnormality of the temperature detected by the first temperature sensor and the second temperature sensor when the first estimation value is equal to or larger than a first upper limit value and the second estimation value is equal to or larger than a second upper limit value.

3. The image forming apparatus according to claim 1, wherein the controller is configured to:

determine, based on a difference between the first estimation value and the second estimation value, a first temperature difference or a second temperature difference, the first temperature difference being between a temperature detected by the first temperature sensor and an actual temperature of the first region, the second temperature difference being between a temperature detected by the second temperature sensor and an actual temperature of the second region, and output information indicating the first temperature difference or the second temperature difference.

4. The image forming apparatus according to claim 1, wherein the controller is configured to:

determine, based on a difference between the first estimation value and the second estimation value, a first temperature difference or a second temperature difference, the first temperature difference being between the temperature detected by the first temperature sensor and an actual temperature of the first region, the second temperature difference being between the temperature detected by the second temperature sensor and an actual temperature of the second region, update a high stop temperature for the first region according to the first temperature difference, and update a high stop temperature for the second region according to the second temperature difference.

5. The image forming apparatus according to claim 1, wherein the temperature sensor includes a detecting section configured to contact a surface of the fixing member that contacts the medium.

6. The image forming apparatus according to claim 1, wherein the heat source includes a center heater, and side heaters on opposite sides of the center heater.

7. The image forming apparatus according to claim 1, further comprising:

a memory configured to store information indicating values of rises in actual temperatures with respect to the difference between the first estimation value and the second estimation value.

8. The image forming apparatus according to claim 1, further comprising:

a communication interface configured to output the information indicating the abnormality of the temperature to an external equipment.

9. The image forming apparatus of claim 1, wherein the controller further is configured to acquire the first estimation value and the second estimation value based on a heat capacity of the fixing unit and heat resistance of the fixing unit.

10. The image forming apparatus of claim 9, wherein the controller further is configured to acquire an estimation value of the temperature of the fixing member based on a power supply voltage value of the fixing unit and an energization pulse for controlling energization to the heat source.

11. A method of operating an image forming apparatus, comprising:

forming, by an image forming mechanism, a developer image;

transferring, by the image forming mechanism, the formed developer image onto a medium;

contacting, by a fixing member of a fixing unit, the medium on which the developer image is transferred onto;

heating, by a heat source, the fixing member;

detecting, by a first temperature sensor, a temperature of a first region in the fixing member; and detecting, by a second temperature sensor, a temperature of a second region in the fixing member, and outputting, by a controller, information indicating an abnormality of the temperature detected by at least one of the first temperature sensor or the second temperature sensor, based on a difference between a first estimation value and a second estimation value, the first estimation value being an estimate of a temperature of the first region in the fixing member, and the second estimation value being an estimate of a temperature of the second region in the fixing member.

12. The method of claim 11, further comprising, outputting, by the controller, information indicating the abnormality of the temperature detected by the first temperature sensor and the second temperature sensor when the first estimation value is equal to or larger than a first upper limit value and the second estimation value is equal to or larger than a second upper limit value.

13. The method of claim 11, further comprising:

determining, by the controller based on a difference between the first estimation value and the second estimation value, a first temperature difference or a second temperature difference, the first temperature difference being between a temperature detected by the first temperature sensor and an actual temperature of the first region, the second temperature difference being between a temperature detected by the second temperature sensor and an actual temperature of the second region, and outputting, by the controller, information indicating the first temperature difference or the second temperature difference.

14. The method of claim 13, further comprising:

determining, by the controller based on a difference between the first estimation value and the second estimation value, a first temperature difference or a second temperature difference, the first temperature difference being between the temperature detected by the first temperature sensor and an actual temperature of the first region, the second temperature difference being between the temperature detected by the second temperature sensor and an actual temperature of the second region, updating, by the controller, a high stop temperature for the first region according to the first temperature difference, and updating, by the controller, a high stop temperature for the second region according to the second temperature difference.

15. The method of claim 11, wherein the temperature sensor includes a detecting section configured to contact a surface of the fixing member that contacts the medium.

16. The method of claim 11, wherein the heat source includes a center heater, and side heaters on opposite sides of the center heater.

17. The method of claim 11, further comprising:

storing, by a memory, information indicating values of rises in actual temperatures with respect to the difference between the first estimation value and the second estimation value.

18. The method of claim 11, further comprising:

outputting, by a communication interface, the information indicating the abnormality of the temperature to an external equipment.

19. The method of claim 11, further comprising acquiring, by the controller, the first estimation value and the second estimation value based on a heat capacity of the fixing unit and heat resistance of the fixing unit.

20. The method of claim 19, further comprising acquiring, by the controller, an estimation value of the temperature of the fixing member based on a power supply voltage value of the fixing unit and an energization pulse for controlling energization to the heat source.

* * * * *